(12) United States Patent
Hensley

(10) Patent No.: US 7,857,344 B2
(45) Date of Patent: Dec. 28, 2010

(54) TRAILER HITCH WITH ADJUSTABLE HITCH BAR

(75) Inventor: James C. Hensley, 879 Green Street Rd., Centralia, IL (US) 62801

(73) Assignee: James C. Hensley, Centralia, IL (US)

(*) Notice: Subject to any disclaimer, the term of this patent is extended or adjusted under 35 U.S.C. 154(b) by 198 days.

(21) Appl. No.: 12/183,265

(22) Filed: Jul. 31, 2008

(65) Prior Publication Data
US 2009/0033061 A1 Feb. 5, 2009

Related U.S. Application Data

(60) Provisional application No. 60/953,390, filed on Aug. 1, 2007.

(51) Int. Cl.
*B60D 1/06* (2006.01)
(52) U.S. Cl. .................................. 280/455.1
(58) Field of Classification Search ............. 280/455.1, 280/446.1, 456.1, 460.1
See application file for complete search history.

(56) References Cited

U.S. PATENT DOCUMENTS

| | | |
|---|---|---|
| 2,133,065 A | 10/1938 | Weber |
| 2,704,218 A | 3/1955 | Claud-Mantle |
| 2,871,029 A | 1/1959 | Demarest |
| 2,940,776 A | 6/1960 | Curtis |
| 3,057,644 A | 10/1962 | Fisher |
| 3,279,819 A | 10/1966 | Edmonds |
| 3,393,923 A | 7/1968 | Rendessy |
| 3,520,556 A | 7/1970 | Warner |
| 3,602,529 A | 8/1971 | Derr, Jr. |
| 3,690,699 A | 9/1972 | Derr, Jr. |
| 3,724,913 A | 4/1973 | Levy |
| 3,751,069 A | 8/1973 | Suckow |
| 3,778,088 A | 12/1973 | Alexander |
| 3,787,068 A | 1/1974 | Miller |
| 3,861,717 A | 1/1975 | Knox |
| 3,871,686 A | 3/1975 | Rendessy |
| 3,891,237 A | 6/1975 | Allen |
| 3,891,238 A | 6/1975 | Ehlert |
| 3,909,075 A | 9/1975 | Pittet, Jr. et al. |
| 3,948,544 A | 4/1976 | Presley et al. |
| 3,964,767 A | 6/1976 | Williams |

(Continued)

FOREIGN PATENT DOCUMENTS

DE 2057388 11/1970

(Continued)

OTHER PUBLICATIONS

EAZ-LIFT Price List, Dec. 1, 1977.

*Primary Examiner*—Kevin Hurley
(74) *Attorney, Agent, or Firm*—Polster, Lieder, Lucchesi, L.C.

(57) ABSTRACT

A trailer hitch having an adjustable hitch bar for coupling with a tow vehicle and a front member coupled with the adjustable hitch bar. A rear member couples with a trailer frame and a yoke couples between the rear member and the trailer frame. Converging links connect between the front member and the rear member, whereby the angular position between the front member and the rear member can be varied. The converging links effectively move the pivot point between the tow vehicle and trailer forward of the hitch assembly.

20 Claims, 19 Drawing Sheets

U.S. PATENT DOCUMENTS

| | | | |
|---|---|---|---|
| 3,967,863 A | 7/1976 | Tomecek et al. | |
| 3,981,517 A | 9/1976 | Crochet, Sr. | |
| 4,077,234 A | 3/1978 | Crochet, Sr. | |
| 4,178,011 A | 12/1979 | Kirsch | |
| 4,196,918 A | 4/1980 | Strader | |
| 4,198,073 A | 4/1980 | Olsen | |
| 4,213,627 A | 7/1980 | Thompson | |
| 4,281,847 A | 8/1981 | Robe | |
| 4,312,516 A | 1/1982 | Olsen | |
| 4,398,252 A | 8/1983 | Frait | |
| 4,511,159 A | 4/1985 | Younger | |
| 4,515,387 A | 5/1985 | Schuck | |
| 4,560,184 A | 12/1985 | Williams, Jr. | |
| 4,572,030 A | 2/1986 | Sakurai et al. | |
| 4,582,337 A | 4/1986 | Hsueh | |
| 4,606,549 A | 8/1986 | Williams, Jr. | |
| 4,613,149 A | 9/1986 | Williams, Jr. | |
| 4,721,344 A | 1/1988 | Frait et al. | |
| 4,722,542 A | 2/1988 | Hensley | |
| 4,726,627 A | 2/1988 | Frait et al. | |
| 4,802,562 A | 2/1989 | Kuroyanagi et al. | |
| 4,804,237 A | 2/1989 | Gee et al. | |
| 4,811,967 A | 3/1989 | Hensley | |
| 4,888,997 A | 12/1989 | Eckert et al. | |
| 4,978,177 A | 12/1990 | Ingraham et al. | |
| 5,010,972 A | 4/1991 | Ingraham et al. | |
| 5,217,280 A | 6/1993 | Nykerk et al. | |
| 5,222,754 A | 6/1993 | Few | |
| 5,251,966 A | 10/1993 | Friederichs et al. | |
| 5,273,347 A | 12/1993 | Hansson | |
| 5,306,037 A | 4/1994 | Robertson | |
| 5,427,440 A | 6/1995 | Ward et al. | |
| 5,438,516 A | 8/1995 | Neubauer et al. | |
| 5,443,306 A | 8/1995 | Broome | |
| 5,615,930 A | 4/1997 | McGrath et al. | |
| 5,620,236 A | 4/1997 | McGrath et al. | |
| 5,660,409 A | 8/1997 | Hensley | |
| 5,707,071 A | 1/1998 | Prestidge et al. | |
| 6,286,851 B1 * | 9/2001 | Sargent | 280/455.1 |
| 6,485,046 B1 | 11/2002 | Hsueh et al. | |
| 6,536,793 B2 * | 3/2003 | Sargent | 280/455.1 |
| 2001/0033068 A1 | 10/2001 | Melesko et al. | |
| 2002/0190498 A1 | 12/2002 | Schmidt et al. | |

FOREIGN PATENT DOCUMENTS

| | | |
|---|---|---|
| DE | 3301460 | 7/1984 |
| FR | 2696130 | 4/1994 |
| WO | 9408804 | 4/1994 |

* cited by examiner

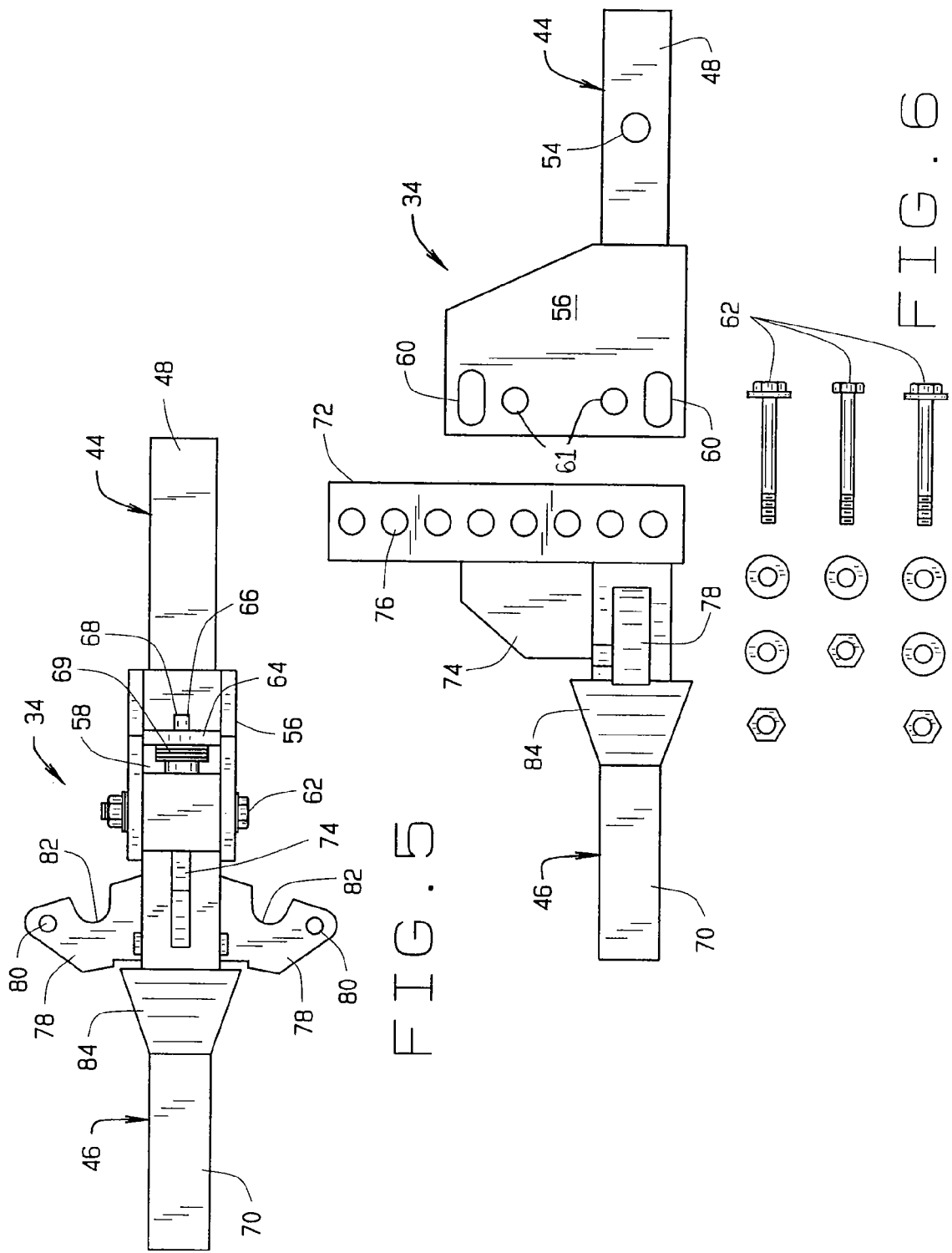

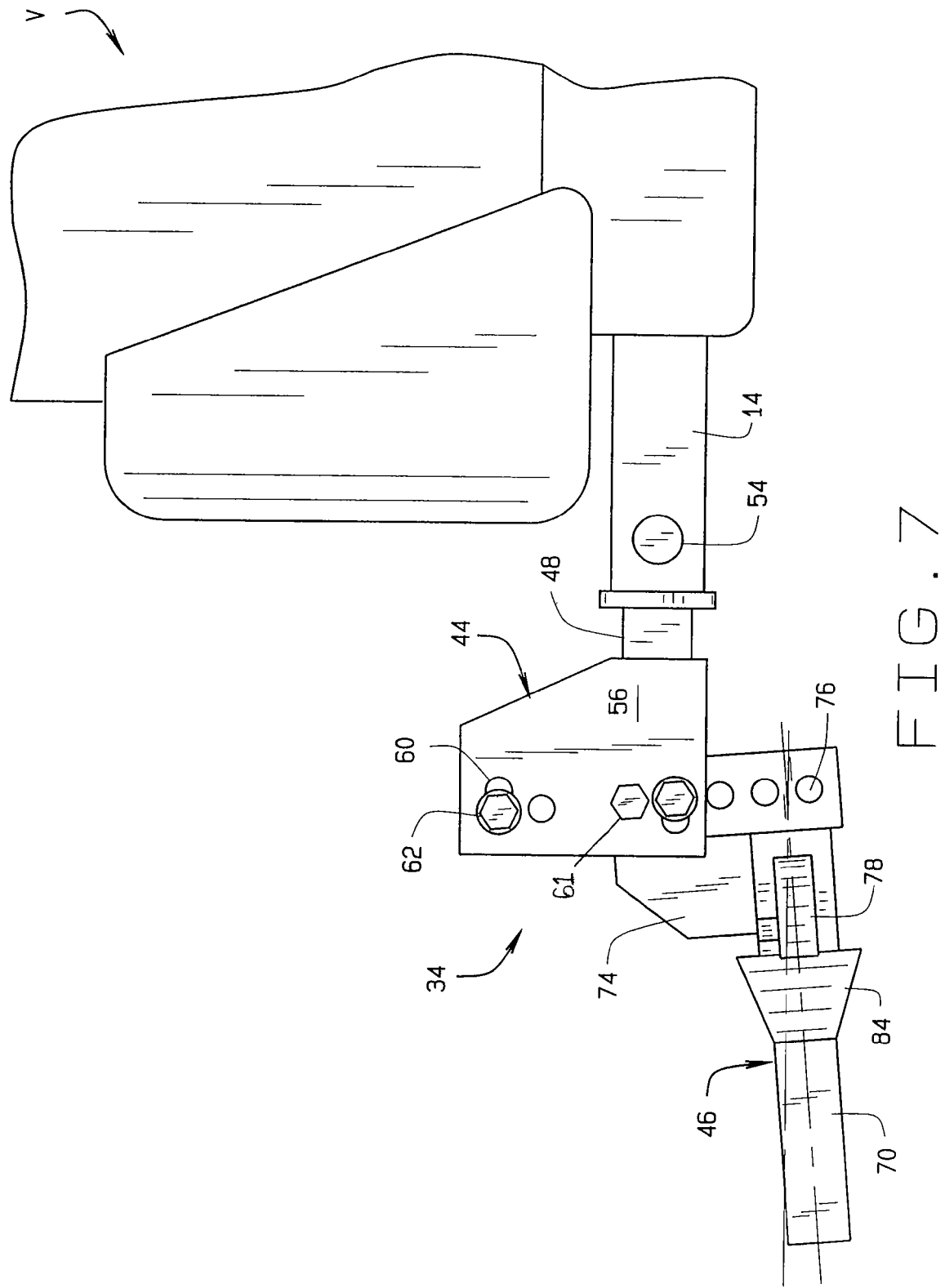

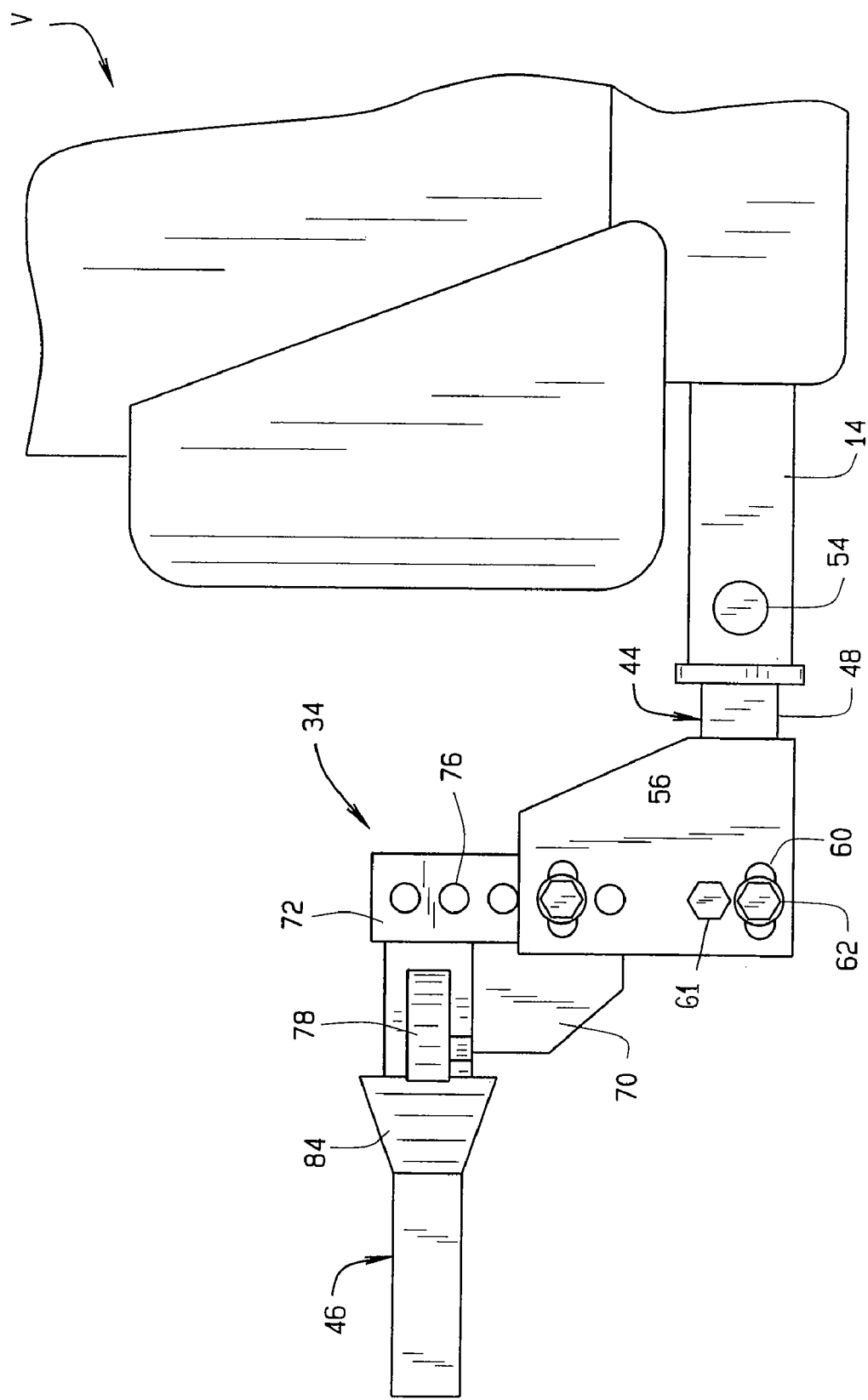

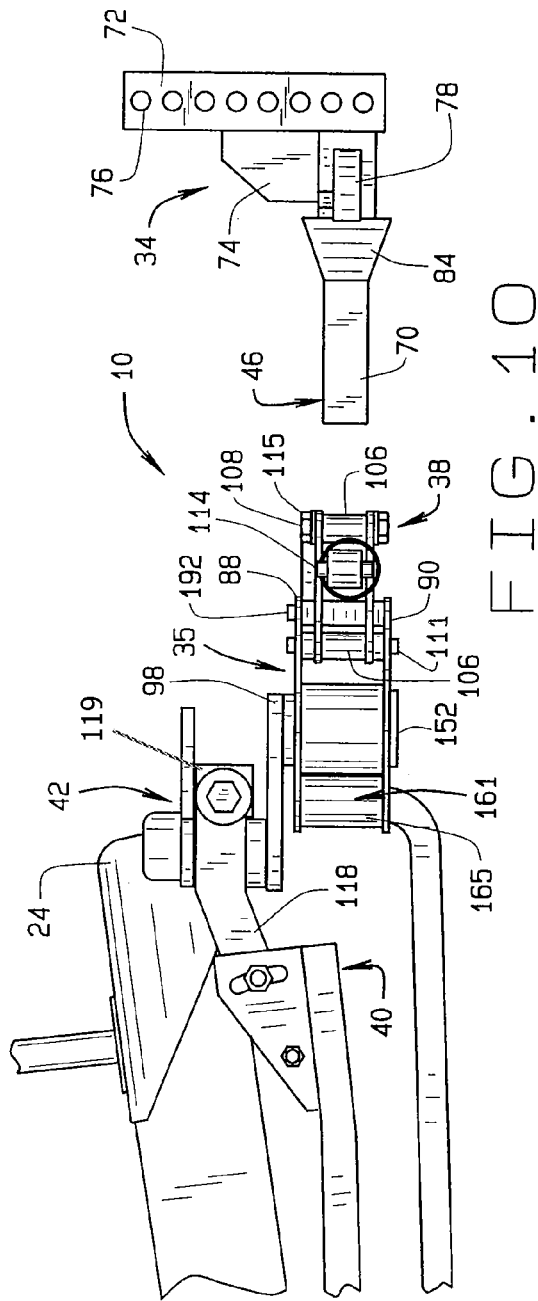

TRAILER HITCH WITH ADJUSTABLE HITCH BAR

CROSS-REFERENCE TO RELATED APPLICATIONS

This application is related to U.S. Provisional Patent Application No. 60/953,390 filed Aug. 1, 2007 from which priority is claimed, and is hereby incorporated by reference.

STATEMENT REGARDING FEDERALLY SPONSORED RESEARCH

Not Applicable.

BACKGROUND OF THE INVENTION

The first trailer hitches only consisted of a clevis and a pin, and later a ball mounted on the framework of a tow vehicle or a ball mount inserted into a receiver type hitch. These types of trailer hitches allowed for movement in all directions between the tow vehicle and the trailer. However, all that movement can negatively affect steering, braking, control, and overall vehicle performance. In addition, the increase in gross trailer weights over the years created the need for trailers that can handle different size weights, both large and small.

To accommodate different gross trailer weights, trailer hitches for light vehicles and trailers, such as autos, vans, SUV's, and pickup trucks, are generally one of four ratings, divided into Classes I-IV. For the purposes of this patent application, gross trailer weight is defined as the weight of the trailer when it is fully loaded. Ordinarily, hitches are rated for 10% of gross trailer weight to be on the tongue, referred to as the tongue weight. For the purposes of this patent application, tongue weight is defined as the weight put on a hitch ball by a trailer coupler.

A Class I hitch comprises a framework attached to a tow vehicle including a ball mount and ball for attaching a trailer coupler. This Class is generally rated at 2,000 lb. gross trailer weight. In addition, the ball mount can be either fixed or removable.

A Class II hitch is similar to Class I, except that the rating is generally 3,500 lb. Like Class I, Class II can have either a fixed or removable ball mount.

A Class III hitch only uses a removable ball mount. This style of hitch is known as a "hitch receiver". In addition to ball mounts, a hitch receiver can be used with other more complicated types of mounts.

A Class IV hitch is similar to Class III, except it is heavier duty. This Class may be rated as high as 14,000 lbs. gross trailer weight.

To handle heavy trailer loads, a weight distribution hitch was invented. As trailer loads increase, tongue weight also increases. When tongue weight increases too much, it pushes down the rear of the tow vehicle causing numerous problems. To counteract this problem, the weight distribution hitch uses spring bars attached to a ball mount and a trailer frame to distribute the tongue weight among all the tow vehicle wheels and all the trailer wheels. As a result, the tow vehicle remains nearer to level from front to back while the trailer is attached. While this type of hitch is a big improvement over previous systems, it does very little to solve the problem of side-to-side movement of the trailer or sway, commonly called fishtail sway.

Fishtail sway is caused by the large distance between the rear axle of the tow vehicle and the hitch assembly and is aggravated by lateral forces against the vehicle caused by winds or passing vehicles. Previous attempts to solve fishtail sway involve stiffening the connection between tow vehicle and trailer by using various methods of friction. While these methods help some, none completely correct the problem.

Therefore, it would be advantageous to have a trailer hitch that prevents fishtail sway without stiffening the connection between the tow vehicle and the trailer.

DESCRIPTION OF THE DRAWINGS

In the accompanying drawings which form part of the specification:

FIG. 5 is a top plan view of the adjustable hitch bar assembly;

FIG. 6 is a side view of an unassembled adjustable hitch bar assembly;

FIG. 7 is a side view of the adjustable hitch bar assembly connected to the tow vehicle in a declined position;

FIG. 8 is a side view of the adjustable hitch bar assembly connected to the tow vehicle in an inverted position;

FIG. 10 is a side view of the front member containing the assembly positioned for connection with the adjustable hitch bar assembly;

FIG. 11 is a top view of the front member containing the assembly positioned for connection with the adjustable hitch assembly;

DETAILED DESCRIPTION

Figure 1:
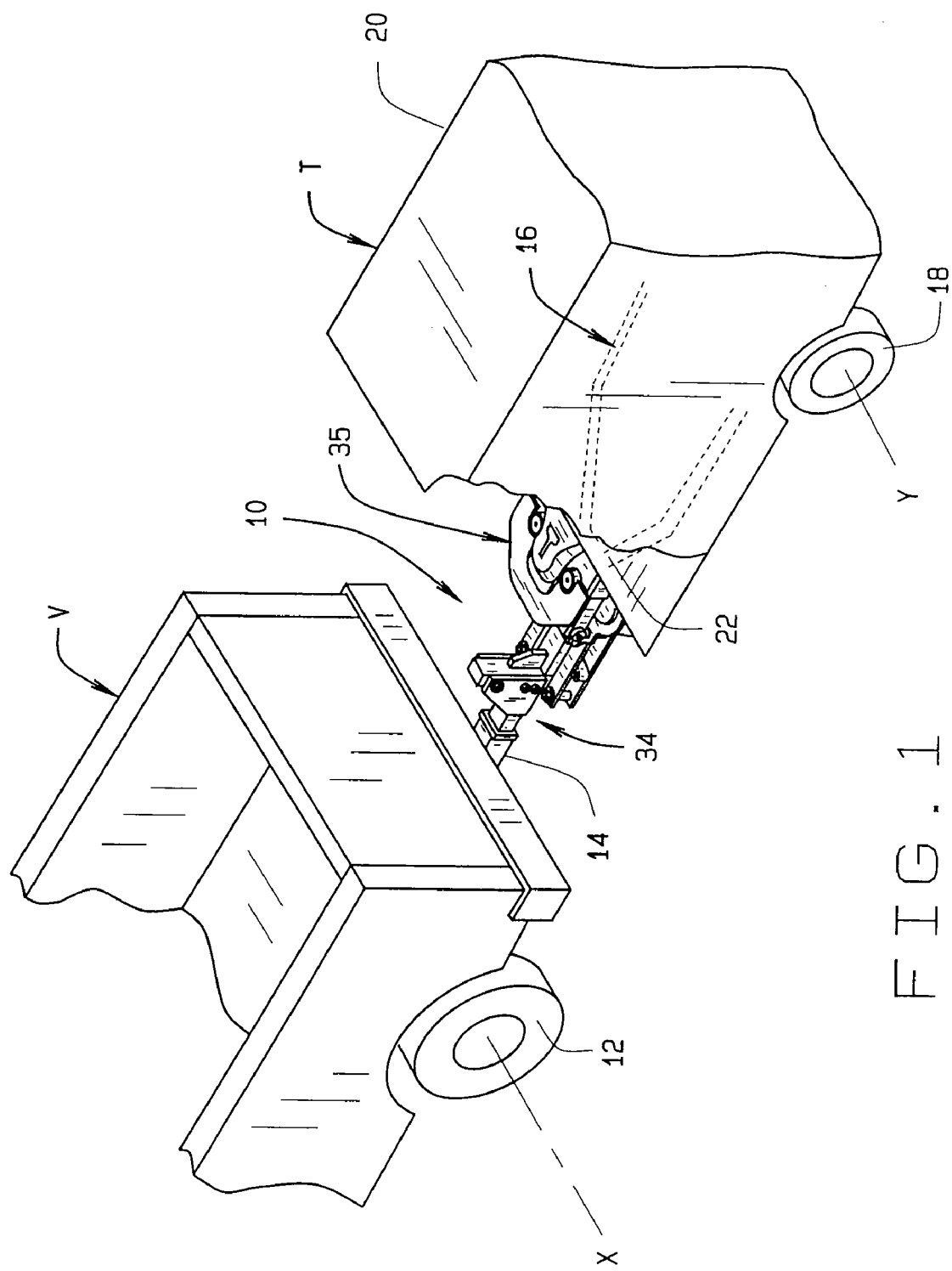
FIG. 1 is an perspective view of a trailer connected to a tow vehicle with a hitch assembly constructed in accordance with and embodying the present invention.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As shown in FIGS. 1-20, a tow vehicle V is coupled to a trailer T with a hitch assembly 10 of the present invention. Those skilled in the art will appreciate that the tow vehicle V can be any conventional automobile, a van, or truck such as the pickup shown in FIG. 1. Further, as used in the specification and the claims, the term trailer is intended to include any type of towable device or vehicle that can be pulled behind or trails a tow vehicle. The tow vehicle V includes rear wheels 12 which revolve about an axis X. The tow vehicle V includes a conventional hitch receiver 14, which is appropriately secured to the tow vehicle V in any conventional or accepted manner.

Figure 2:
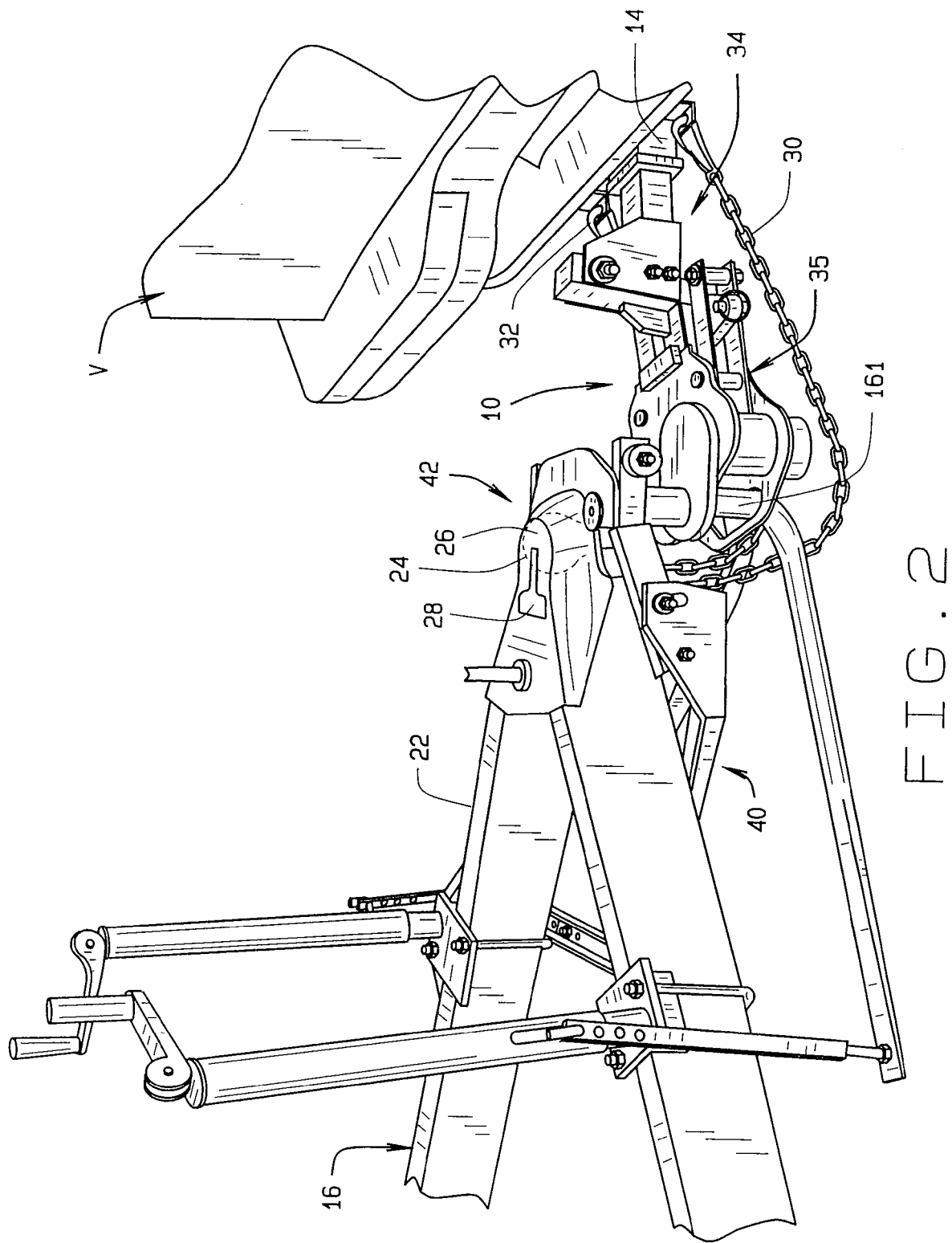
FIG. 2 is an enlarged perspective view of the trailer connected to the tow vehicle with the hitch assembly.

The trailer T has a frame 16 which is supported on wheels 18 that revolve about a common axis Y, and the frame 16 in turn supports a trailer body 20. The front of the frame 16 forms a so-called tongue or A-frame, in that it has side members 22 which converge forwardly and are connected at their forward ends to a coupler 24 used to secure the trailer T to a hitch ball 26 of the hitch assembly 10 (FIG. 2). However, those skilled in the art will recognize that any type of trailer frame can be used. The coupler 24 is a generally spherical socket that opens downwardly and is sized to receive a conventional trailer hitch ball. The coupler 24 also has a conventional locking device 28 which will close upon the hitch ball 26 and retain it in the socket. A typical trailer also includes safety chains 30 and an electric plug 32.

As shown in FIGS. 1-13, the hitch assembly 10 comprises an adjustable hitch bar assembly 34, a front member 35 containing a hitch box 36, an over-center latch assembly 38, a yoke assembly 40, and a rear member 42. The hitch assembly 10 connects the tow vehicle V to the trailer T for transferring the pulling and stopping forces of the tow vehicle V to the trailer T.

Figure 3:
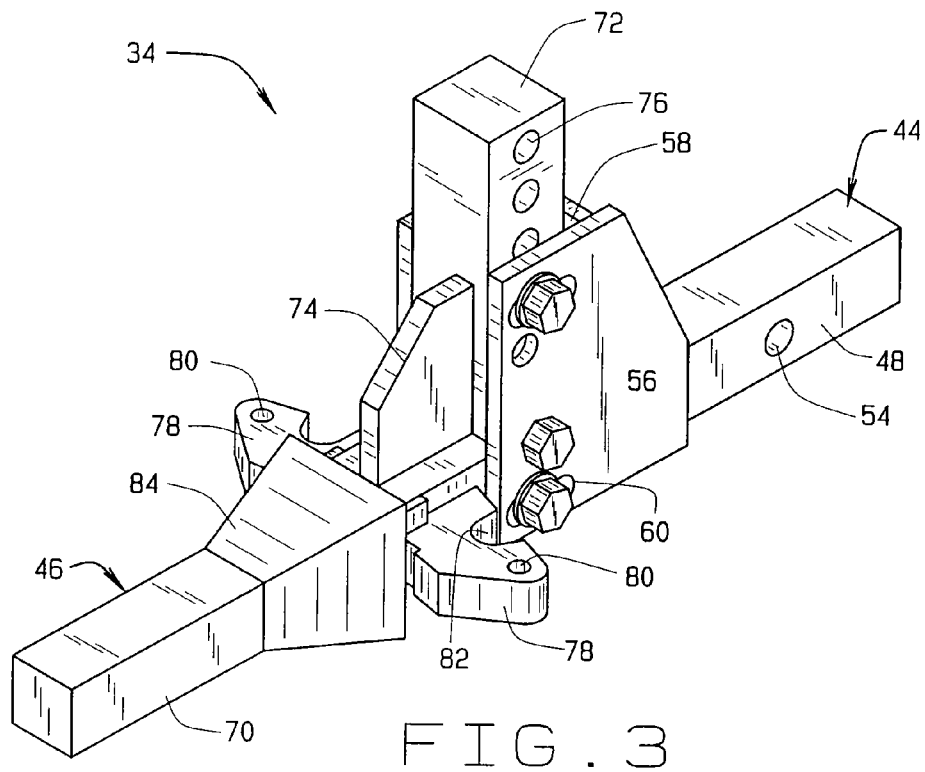
FIG. 3 is a perspective view of an adjustable hitch bar assembly.
Figure 4:
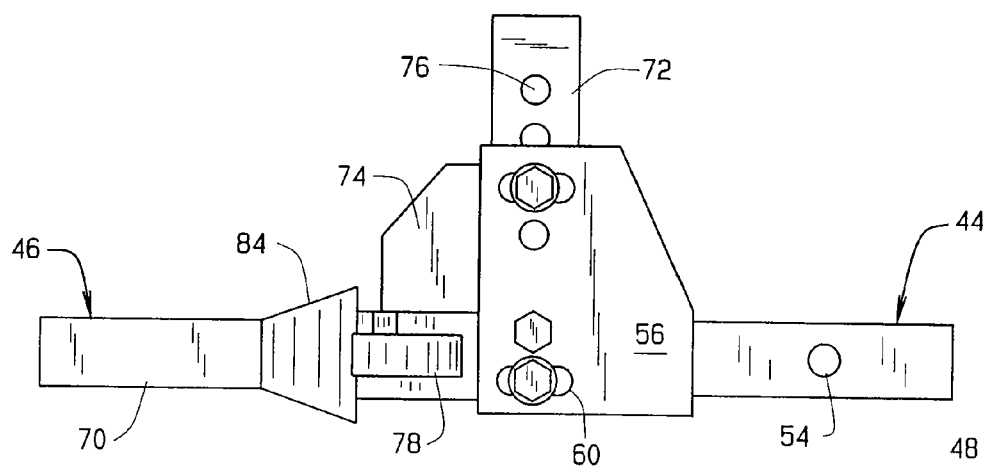
FIG. 4 is a side view of the adjustable hitch bar assembly.
Figure 9:
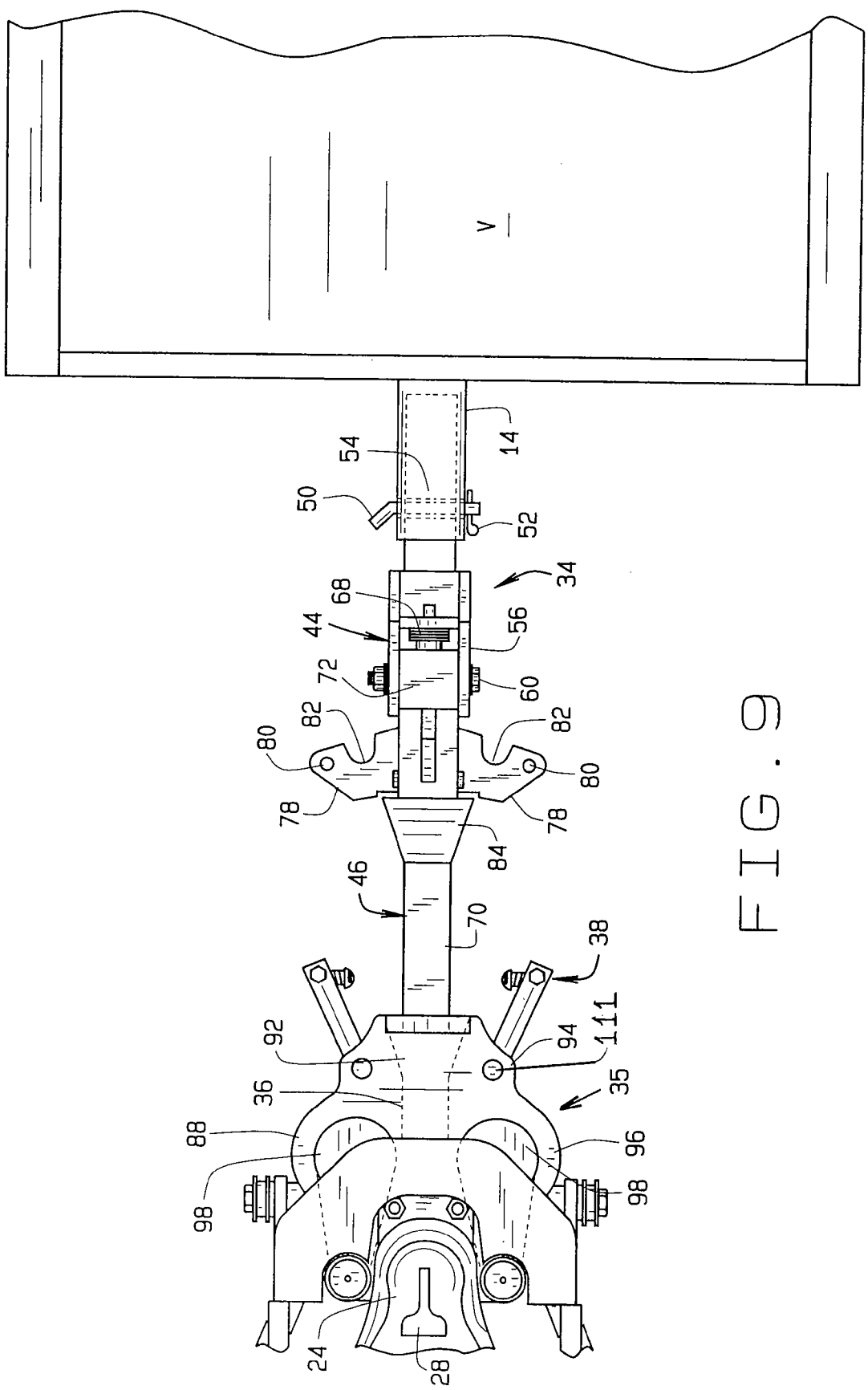
FIG. 9 is a top view of a front member containing a hitch box positioned for connection with the adjustable hitch bar assembly and the tow vehicle.
Figure 12:
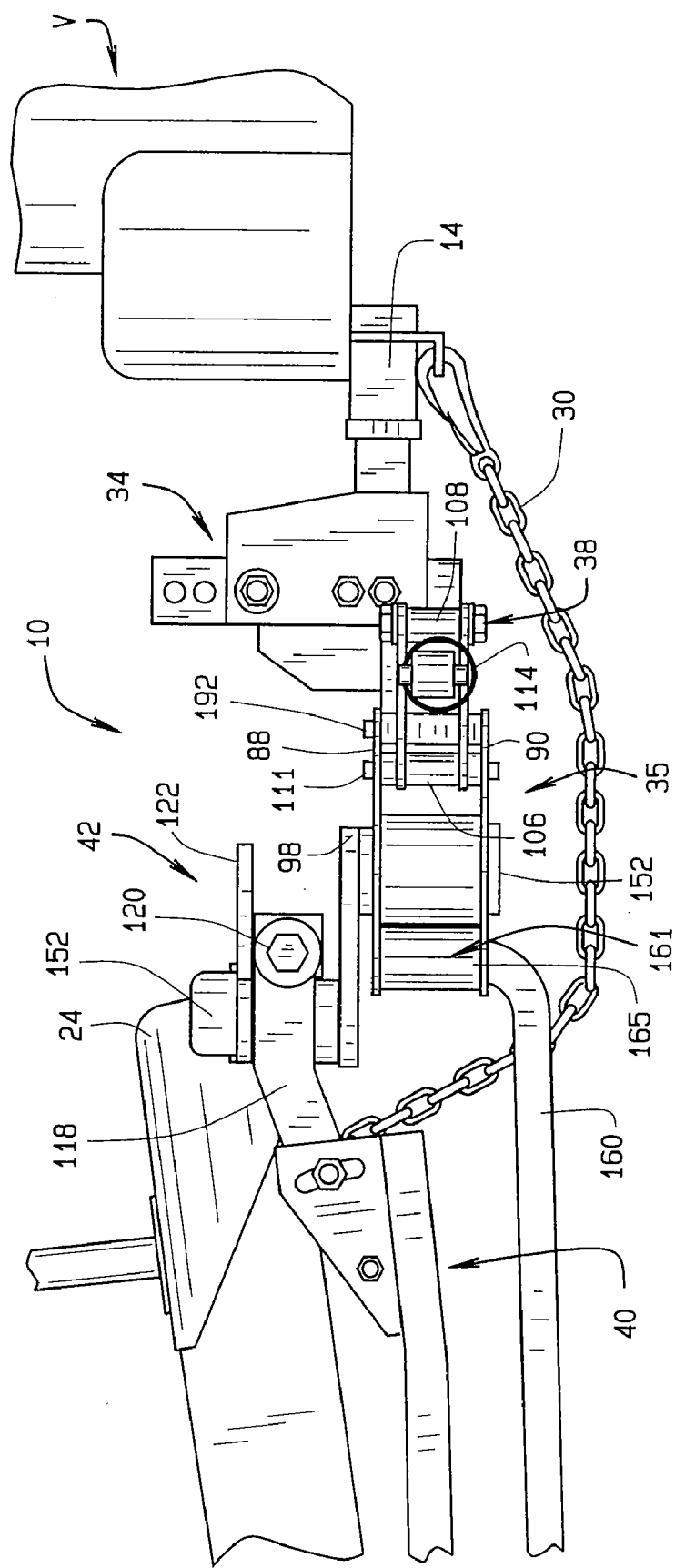
FIG. 12 is a partial side view of the hitch assembly.

As shown in FIGS. 3-9, the adjustable hitch bar assembly 34 adjusts to accommodate elevation and angle differences between the hitch receiver 14 and the front member 35 containing the hitch box 36. To this end, the adjustable hitch bar assembly 34 includes a vehicle portion 44 adjustably and removeably attached to a trailer portion 46. The vehicle portion 44 is a generally square bar 48 that inserts into the hitch receiver 14 and projects rearwardly in a generally horizontal orientation with its longitudinal axis along the centerline of the tow vehicle V. The bar 48 fits snugly into the hitch receiver 14 with very little clearance and is secured by inserting a standard hitch pin 50 and clip 52 into corresponding through holes 54 (FIG. 9). Two attachment plates 56 attach, such as by welding, to the opposite end of the bar 48, thereby defining a channel 58 between the plates 56 for receiving the trailer portion 46 (FIG. 3). Slots 60 and pivot hole 61 for receiving fasteners 62 provide adjustable engagement with the trailer portion 46 (FIG. 6). In operation, the trailer portion pivots about the pivot hole 61 for positioning relative to the vehicle portion 44. A crosspiece 64 extends between the two attachment plates 56 and defines a hole 66 for receiving a pin 68 with spacers 69 slid over the pin 68 (FIG. 5).

The trailer portion 46 is a generally square bar 70 that inserts into the hitch box 36 and projects forwardly in a generally horizontal orientation with its longitudinal axis along the centerline of the tow vehicle V (FIG. 9). An upright 72 extends perpendicularly from an end of the bar 70 and is positioned to insert into the channel 58 of the vehicle portion 46 (FIGS. 5-6). A support 74 attaches between the bar 70 and the upright 72, such as by welding, to provide additional strength to the trailer portion 46. A plurality of holes 76 in the upright 72 provide for adjustable engagement with the slots 60 of the attachment plates 56 of the vehicle portion 44 using fasteners 62. As shown in FIGS. 3-7, the plurality of holes 76 along the upright 72 allow the trailer portion 46 to engage the vehicle portion 44 at multiple elevations. For even further elevation options, the trailer portion 46 can be inverted (FIG. 8) or the vehicle portion 44 can be inverted. The slots 60 allow the trailer portion 44 to be positioned at multiple angles relative to the vehicle portion 44 (FIG. 7), such as about 8° to 10°. The upright 72 rests against the pin 68 with spacers 69 to secure the upright 72 at the desired angle (FIG. 5). The number of spacers 69 can be added or removed to achieve different angles for the trailer portion 46 relative to the vehicle portion 44.

The trailer portion 46 includes over-center latch tabs 78 welded to each side of the bar 70 at about the mid-section (FIG. 3). The tabs 78 project laterally from the bar 70 and define through holes 80, concave recesses 82, for coupling with the over-center latch assembly 38 to be described below. The adjustable hitch bar assembly 34 also includes a stop 84 welded to each side of the bar 70 and positioned to the rear of the tabs 78 for mating with the hitch box 36 to be described below (FIG. 9). The stops 84 are wedges with beveled faces facing rearwardly with an angle of about 14°. Such a steep angle allows for easier engagement between the bar 70 and the hitch box 36.

As shown in FIGS. 9-13, the front member 35 includes a generally rectangular hitch box 36 joined between an upper plate 88 and a lower plate 90. The hitch box 36 comprises angular walls 92 joined to form a partially funnel-shaped enclosure that narrows from a front end towards a back end for receiving the adjustable hitch bar assembly 34. The interior dimensions of the angular walls 92 should provide enough clearance so the bar 70 of the trailer portion 46 can extend to the rear of the hitch box 36 when inserted. In addition, the walls 92 are angled to match the beveled faces of the stops 84 of the adjustable hitch bar assembly 34 for proper seating. The upper plate 88 and lower plate 90 include four front holes 94 for attaching the over-center latch assembly 38 and four back holes 96 for attaching converging links 98.

As shown in FIGS. 9-13, the over-center latch assembly 38 is similar to the one disclosed in U.S. Pat. No. 4,811,967, which is used to secure the front member 35 containing the hitch box 36 to the adjustable hitch bar assembly 34. The over-center latch assembly 38 includes a left latch 100 and right latch 102 each comprising a pair of connecting links 104, a vertical tube 106, a pivot pin 108, a thrust link 110, a latch pin 111, and a safety pin 114. Each connecting link 104 is a straight bar defining front through holes and back through holes. The pair of connecting links 104 are connected in parallel by hingedly attaching the pivot pin 108 between the front holes and by fixedly attaching the hollow vertical tube 106 between the back holes. The pivot pin 108 defines a transversely directed threaded bore for receiving the thrust link 110 located midway between the two connecting links 104. The thrust link 110 is a threaded rod with a cross head 112 which inserts into the threaded bore of the pivot pin 108 so the surface of the cross head 112 is presented away from the pivot pin 108 for engaging the latch tabs 78 of the adjustable hitch bar assembly 34. The thrust link 110 can be screwed either in or out of the threaded bore to allow for any adjustment needed to ensure a tight fit with the latch tabs 78. To rotate the pivot pin 108 and thrust link 110 about a vertical axis, hexagonal heads 115 are attached to each end of the pivot pin 108. The hexagonal heads 115 can be engaged by a conventional end, socket or box wrench to rotate the pivot pin 108 and thrust link 110 to engage and disengage the adjustable hitch bar assembly 34. The left latch 100 and right latch 102 are attached to respective front holes 94 of the front member 35 containing the hitch box 36 by inserting each latch 100 and 102 in between the top and bottom front holes 94 so the vertical tubes 106 align with the through holes. To secure both latches 100 and 102, latch pins 112 are inserted through the front holes 94 into the vertical tubes 106 so the latches 100 and 102 can rotate about a vertical axis. For additional security, the latch pins 111 can be secured with cotter pins or other suitable means.

To secure the adjustable hitch bar assembly 34 to the front member 35, the bar 70 of the adjustable hitch bar assembly 34 inserts into the hitch box 36 until the stops 84 seat against the walls 92 of the hitch box 36. The latches 100 and 102 pivot from a slightly outward direction to a slightly inward position, referred to as the over-center position so the connecting links 104 rest against a reinforcement band 192 about the opening of the hitch box 36. A conventional end, socket or box wrench engages the hexagonal heads 115 of the pivot pins 108 and rotates the pivot pins 108 and thrust links 110 so the cross heads 112 engage the recesses 82 of the latch tabs 78, also referred to as the over-center position. In this position, the front member 35 is prevented from moving laterally or vertically with respect to the adjustable hitch bar assembly 34. Of course, the over-center latch assembly 38 prevents the front member 35 from pulling away from the adjustable hitch bar assembly 34. For extra safety, the safety pins 114 are inserted into the through holes 80 of the latch tabs 78. The safety pins 114 prevent the latches 100 and 102 from moving outwardly away from the over-center position. Of course, before anyone attempts to swing either latch 100 or 102 outwardly in order to disconnect the front member 35, the safety pins 114 must be removed.

The rear member 42 is a generally rectangular frame having a U-shaped lower member 116, which can comprise a lower plate and two end blocks 119, with yoke extensions 118 pivotally attached to each end of the lower member 116 and extending rearwardly for connecting to the yoke assembly 40 with fasteners 120 (FIGS. 9-13). A hitch ball 26 mounts to the lower member 116 at about the midpoint for receiving the coupler 24 of the trailer T. A front plate 117 extends across the front portion of the lower member 116. A generally C-shaped guard 122 extends between the yoke extensions 118.

The yoke assembly 40 includes two side members 124, each having a substantially parallel forward section 126 and an inwardly angled rear section 128. The rear sections 128 attach to a tail section 130, which includes a bar 132 with a tail tube 134 extending rearwardly. A crossbar 136 extends between the side members 124 to provide support. Attachment plates 138 extend upwardly from the forward section 126 to define a channel 140 for engagement with the yoke extensions 118. Slots 142 provide for adjustable engagement between the yoke assembly 40 and the yoke extension 118 to accommodate different couplers and different frame sizes.

In operation, the pulling and stopping forces are transmitted from the tow vehicle V through the hitch receiver 14 to the adjustable hitch bar assembly 34, from hitch bar assembly 34 to the hitch box 36 to the converging links 98, from the converging links 98 to the rear member 42, from the rear member 42 to the hitch ball 26, from the hitch ball 26 to the trailer coupler 24, from the trailer coupler 24 to the trailer frame 22.

Figure 13:
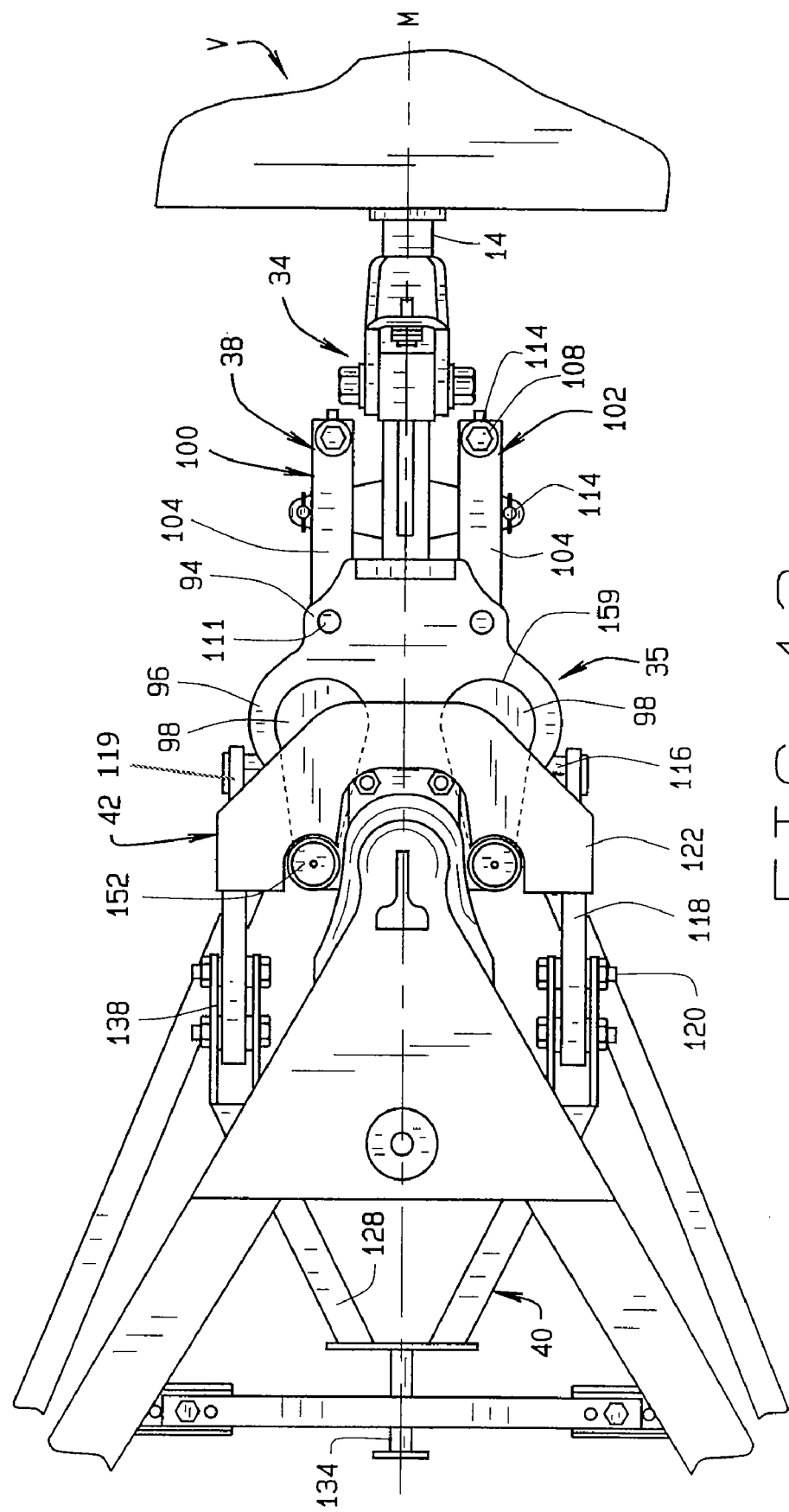
FIG. 13 is a partial top view of the hitch assembly during straight travel.
Figure 16:
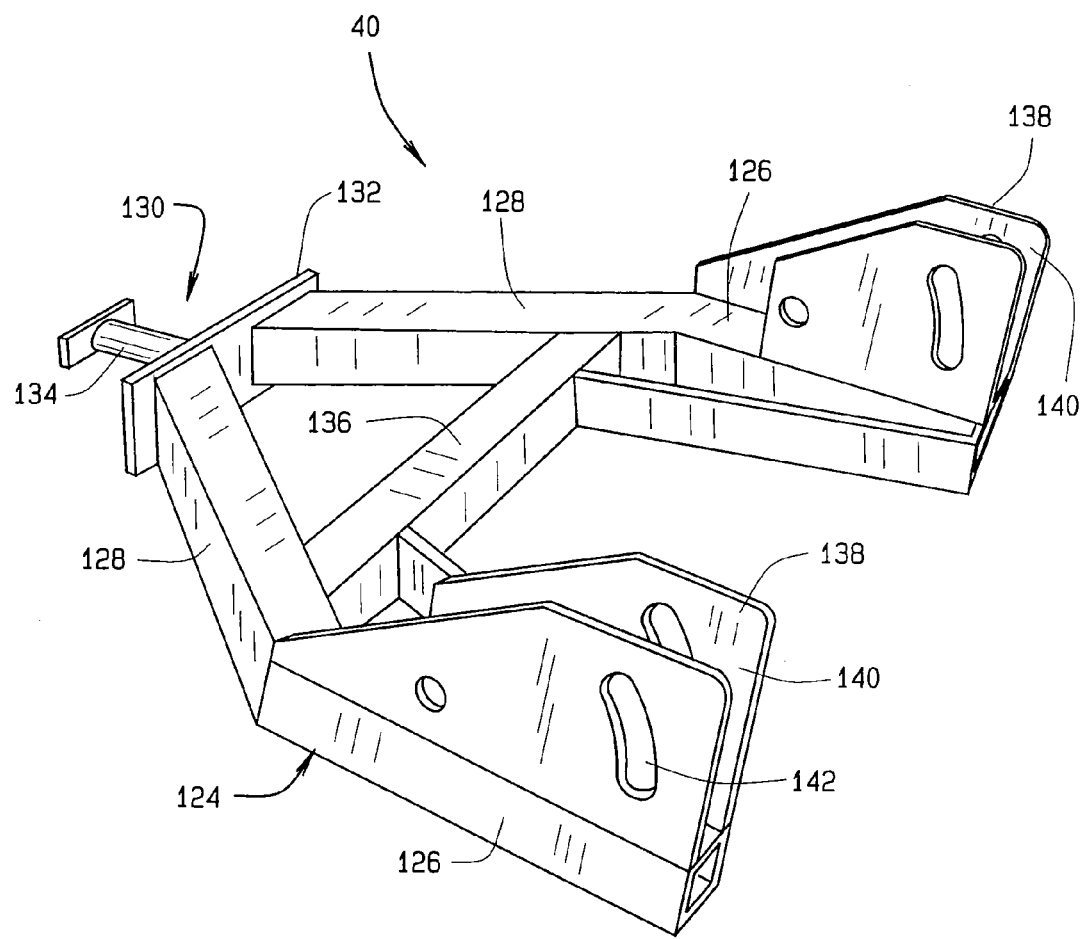
FIG. 16 is an perspective view of a yoke.
Figure 17:
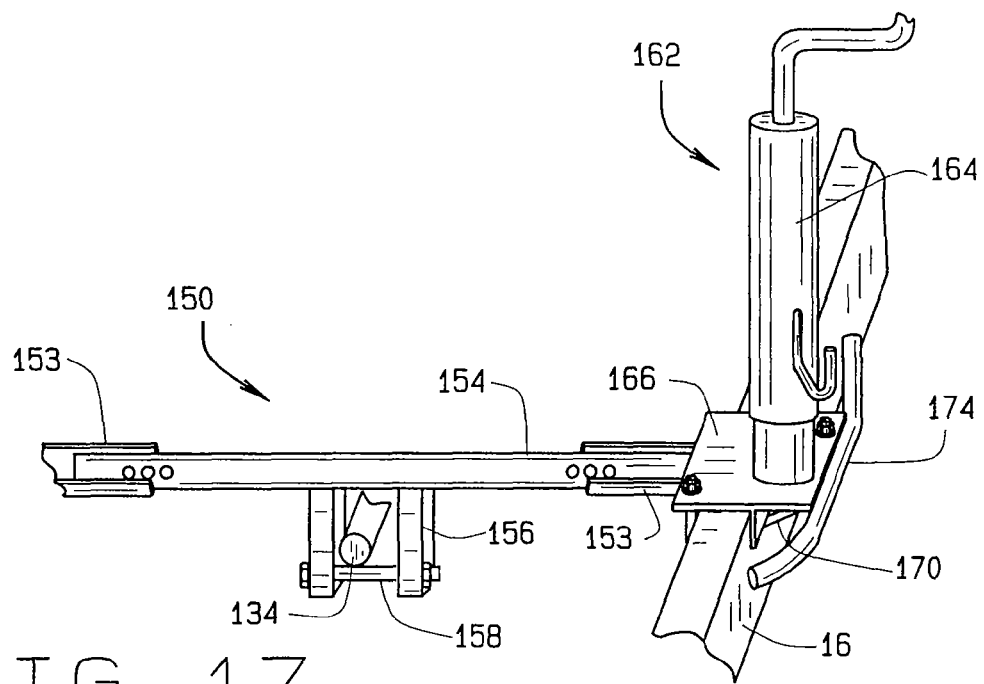
FIG. 17 is a partial rear perspective view of a jack assembly.

As shown in FIGS. 13, 16, and 17, the steering function of the hitch assembly 10 of the present invention is accomplished through a tail support assembly 150, a yoke assembly 40, and converging links 98. The converging links 98 are similar to the ones disclosed in U.S. Pat. No. 4,722,542 and U.S. Pat. No. 5,660,409, hereby incorporated by reference. The tail support assembly 150, and converging links 98 effectively move the pivot axis for the hitch assembly 10 to near the rear axle of the tow vehicle V. This projection of the pivot axis provides the hitch assembly 10 with good lateral stability with little or no tendency to sway or fishtail when buffeted by cross winds or when otherwise subjected to lateral forces.

As described above, the rear of the yoke 40 has an extended tail tube 134 that engages the tail support assembly 150. The tail support assembly 150 comprises channels 153 extending inwardly from brackets 166 which are secured to the trailer frame 16 with fasteners 170. A crossbar 154 extends between and attaches to the channels 153, and a bracket 156 attaches to the underside of the crossbar 154 and extends downward so a roller 158 is parallel with the crossbar 154.

When assembled, the tail tube 134 rests snuggly inside the tail bracket 156. Although the roller 158 allows the tail tube 134 to move forward and backward along the longitudinal axis of the rear member 42, the tail bracket 156 restricts any other lateral movement of the tail tube 134. The ability to move forward and backward accommodates any movement created by uneven roads, since the trailer V remains parallel with the longitudinal axis of the tail support assembly 150 at all times.

The converging links 98 are straight links of equal length having bearings 152, such as tapered roller bearings, on each end for pivotally connecting the front member 35 to the rear member 42. When assembled, the converging links 98 are equidistant from the centerline M and converge forwardly (FIG. 13). The convergence is such that the links 98, if extended forwardly, will intersect along a centerline M perhaps ahead of the rear of the tow vehicle V, perhaps ahead of the rear wheels 12. When the trailer T is directly behind the tow vehicle V, the links 98 are symmetrically positioned. When the trailer T shifts to one side or the other during turns, the convergence intersection transfers to points which are closer to the front member 35 and offset from the centerline M. Together, the converging links 98 effectively move the pivot axis for the hitch assembly 10 to near the rear axle of the tow vehicle V.

Figure 14:
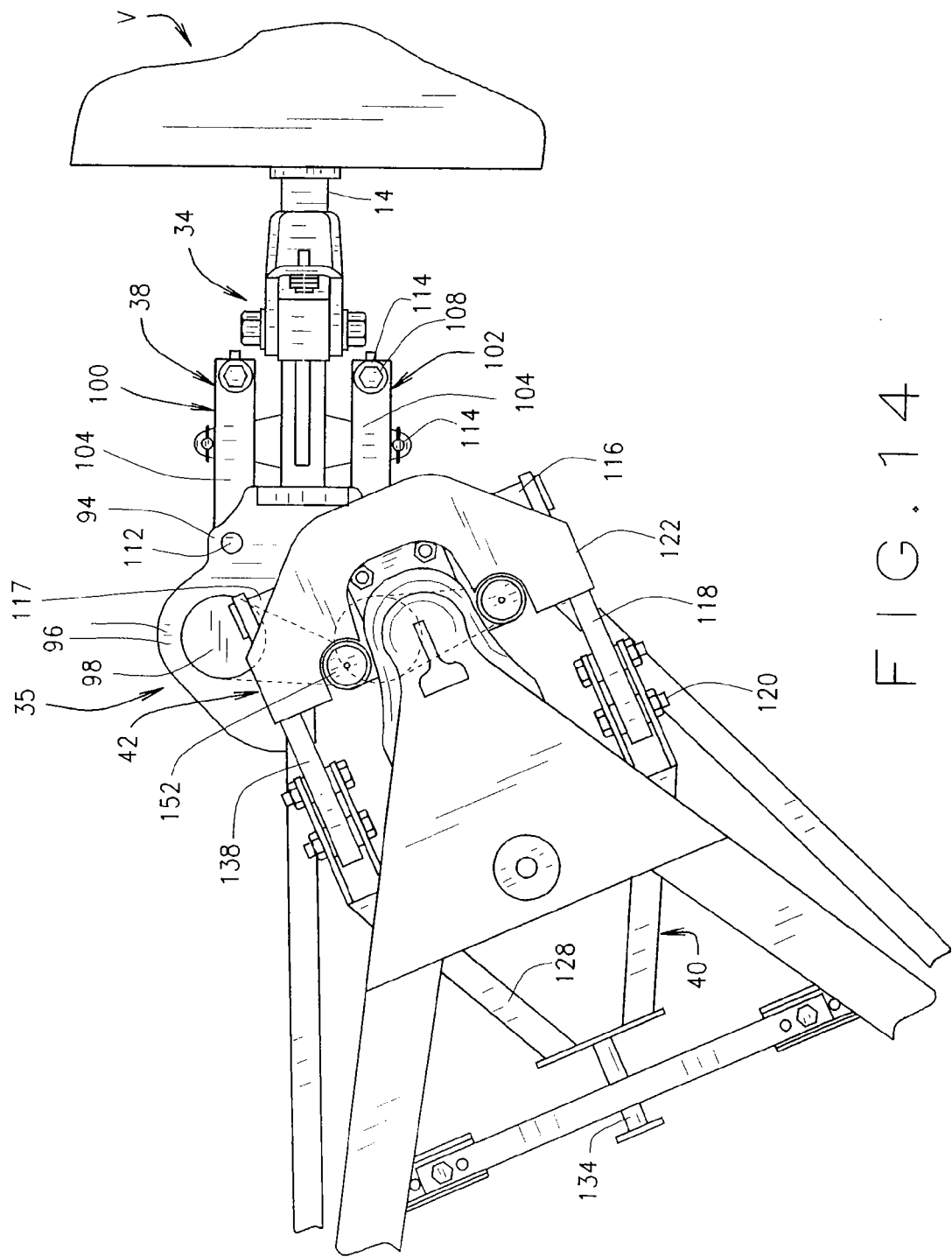
FIG. 14 is a partial top view of the hitch assembly during a slight turn.

The relative relationship of the elements of the hitch assembly 10 when the tow vehicle V and trailer T are negotiating turns are shown in FIGS. 13-14. As the tow vehicle V turns relative to the trailer T, the adjustable hitch bar assembly 34 and front member 35 necessarily move in the direction of hitch receiver 14 on the tow vehicle V. Simultaneously, the converging links 98 pivot to allow turning while maintaining the effective hitch pivot axis near the rear of the tow vehicle V. As the individual links 98 pivot, the relative radius of the links 98 shorten drawing the rear member 42 forward towards the front member 35. The trailer T remains parallel with the longitudinal axis of the rear member 42 because the trailer T is rigidly attached with the yoke 40 along a generally horizontal plane to the rear member 42.

Where the tongue weight of the trailer T is quite heavy, it is desirable to redistribute the weight of the trailer T, so that more of it is carried by the wheels of the trailer T and the front wheels of the tow vehicle V and less of it by the rear wheels 12 of the tow vehicle V. To this end, spring bars 160 and the jack assembly 162 distribute the tongue weight among all the tow vehicle wheels 12 and all the trailer wheels 18.

As mentioned above, the spring bars 160 are attached to the rear portion of the front member 35 with bushings 161 (FIG. 10). The spring bars 160 extend rearwardly and horizontally at an outward angle to attach to the trailer frame 16 via the jack assembly 162 (FIG. 2). The outward angle positions the rear ends of the spring bars 160 into near alignment with the side members of the trailer's A-frame 16. The spring bars 160 also slope downward toward the rear to allow for tensioning.

Figure 15A:
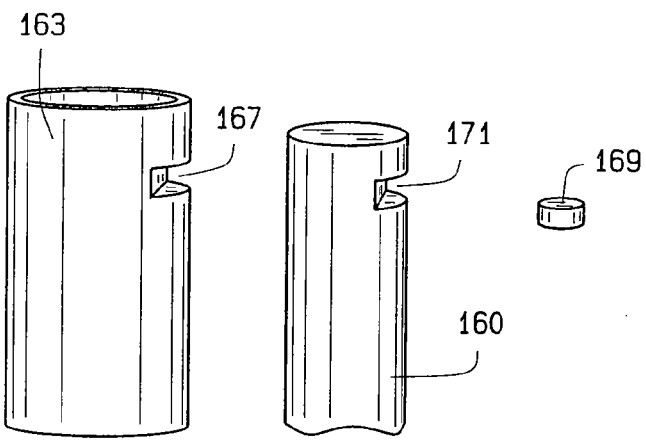
FIG. 15A is a exploded view of spring bar bushings.
Figure 15B:
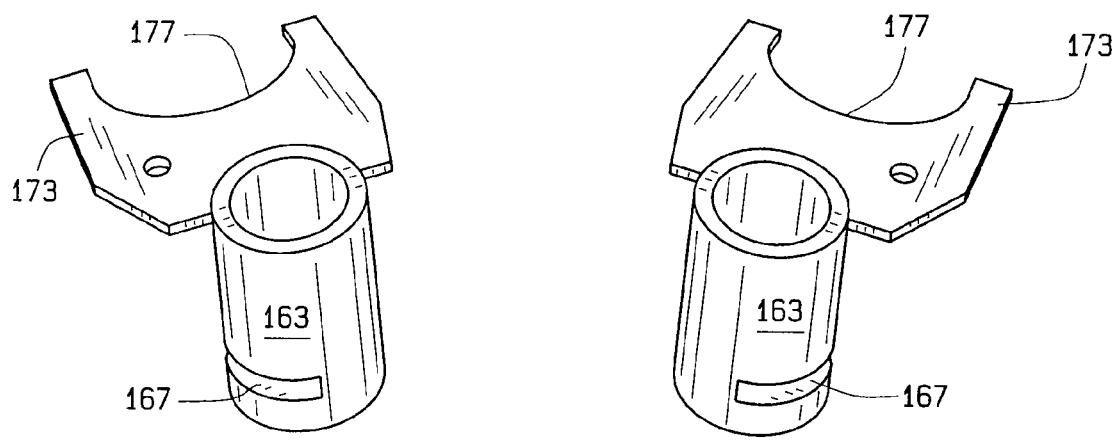
FIG. 15B is a perspective view of the spring bar bushing.
Figure 15C:
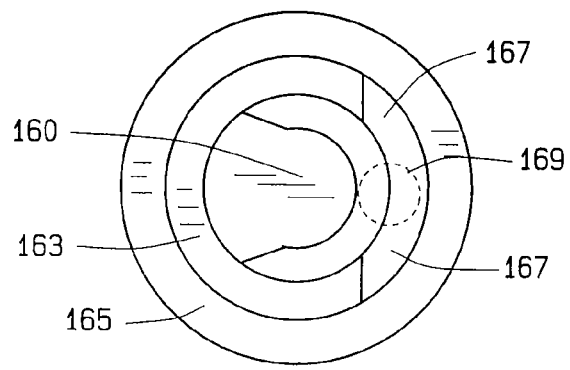
FIG. 15C is a top view of the spring bar bushings.

In the embodiment of FIGS. 1-20, the bushings 161 include an inner bushing 163 pivotally attached to the spring bar 160 and an outer bushing 165 attached to the front member 35. To assemble, the inner spring bar bushing 163 slides over the spring bar 160 until the slots 167 and 171 are aligned. The disk 169 inserts into the aligned slots 167 and 171 (FIG. 15). The spring bar 160 with inner spring bar bushing 163 and disk 169 in place inserts into the outer spring bar bushing 165. With the inner bushing 163 inserted into the outer bushing 165, the disk 169 is secured within the slots 167 and 171 and the spring bar 160 is secured even when no tension is applied to the spring bars 160. The disk 169 can move freely within the aligned slots 167 and 171 to prevent binding or breaking of parts during rotation of the spring bar 160. For replacement after wear or failure, the inner bushing 163 is removeable. Furthermore, different sizes of inner bushings 163 can be inserted into outer bushing 165 to accommodate different sized spring bars 160.

The inner bushing 163 attaches to the front member 35 with a spring bar bushing plate 173, which extends outwardly from a lower end of the inner spring bar bushing 163. The bushing plate 173 includes a recess 177 that seats against the outer surface of the bearing 152 located in the front member 35. A fastener extends through the lower plate 90 on the front member 35 and the spring bar bushing plate 173 to secure the inner bushing 163. This arrangement prevents the inner bushing 163 from rotating in tandem with the spring bars 160.

The jack assembly 162 comprises a pair of jacks 164, jack brackets 166, spring bar links 168, and the spring bars 160. The jack brackets 166 are rectangular plates secured to the top of the side members 16 of the trailer T by fasteners, such as a U-bolt 170. However, the jack brackets 166 can be secured by any other conventional means, such as welding. The jacks 164 are vertically welded to the top surface of the jack brackets 166. The spring bars 160 are attached to the jacks 164 with the spring bar links 168. The upper end of each spring bar link 168 is pivotally attached to each jack 164 and the lower end of the each link 168 is pivotally attached to each spring bar 160 with fasteners 172. Consequently, the jacks 164 can tension the spring bars 160 while still allowing pivotal movement during turns. The jacks 164 should be cranked until appropriate tension is applied to the spring bars 160. Spring bar guards 174 are generally horizontal bars attached, such as by welding, to the outer side surface of the jack bracket 166 and positioned above the spring bars 160 to reduce the potential for damage. Spring bars have long been used in conjunction with trailer hitches to achieve better weight distribution among all the tow vehicle wheels and all the trailer wheels, and the principle will therefore not be described in more detail here.

Figure 19:
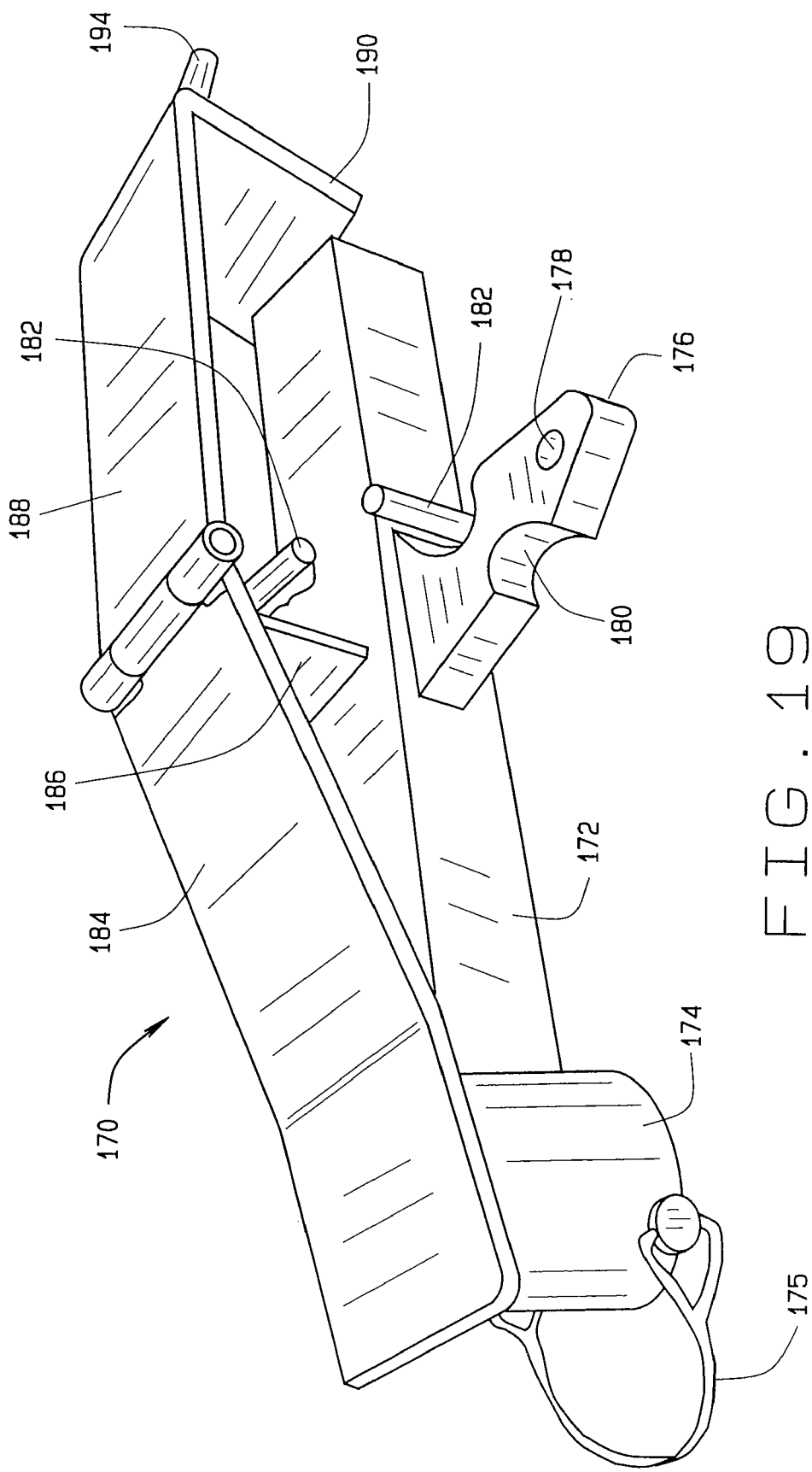
FIG. 19 is an perspective view of a lot bar.

FIG. 19 depicts an embodiment of a lot-bar 170, which is used to connect the front member 35 with the tow vehicle V that does not have a hitch receiver 14. In many light applications, such as on storage lots, dealer lots, and repair shops, vehicles do not have hitch receivers, but rather have hitch balls. In such applications, there is no way to connect the hitch assembly 10 with the tow vehicle V. The lot-bar 170 provides an apparatus to connect the tow vehicle V without a hitch receiver 14 to the front member 35.

The lot-bar 170 includes a generally square bar 172 that inserts into the hitch box 36 and projects forwardly in a generally horizontal orientation with its longitudinal axis along the centerline of the tow vehicle V (FIG. 19). At the opposite end of the bar 172 is a coupler 174 for engaging a hitch ball of a tow vehicle. The coupler 174 is a generally cylindrical socket that opens downwardly and is sized to receive a conventional trailer hitch ball. A bail 175 attaches to the front of the coupler 174 with appropriate fasteners, such as a pin, that is used to secure the coupler 174 to the ball. An over-center latch tab 176 is welded to one side of the bar 172 at about the mid-section. The tab 176 projects laterally from the bar 172 and defines through hole 178 and concave recess 180 for coupling with the over-center latch assembly 38 as described above. The bar 172 also includes stops 182 welded to the rear of the tabs 176 on all four sides of the bar 172 for mating with the hitch box 36. Although, the embodiment of FIG. 19 shows only a single over-center latch tab 176, those skilled in the art will recognize that a second over-center latch tab can be used on the opposite side of the bar 172. In addition, other couplers can be substituted with coupler 174 to engage various types of trailer hitch designs.

A lock bar 184 extends from the top of the coupler 174 along the length of the bar 172 at an upwardly angle of about 30°. A brace 186 supports the lock bar 184 in position. A hinged portion 188 of the lock bar 184 pivots up for the tab 190 to clear the turn warning assembly 200, which is described further below (FIG. 20), when inserting the bar 172 into the hitch box 36. In a locked position, a tab 190 extending downwardly from the hinged portion 188 inserts between about the front portion of the converging links 98. Lock pins 194 extending from the tab 190 insert into mating holes 196 of the front plate 117 (FIG. 13-14). In the locked position, the tab 190 prevents movement of the converging links 98. Thus, all pivoting occurs at the coupler 174. To unlock, the over center latch assembly 38 uncouples from the over-center latch tab 176 and the lot bar 170 moves forward to disengage the lock pins 194 from the mating holes 196. The hinged portion 188 pivots upwardly to let tab 190 clear the turn warning assembly 200.

Figure 20:
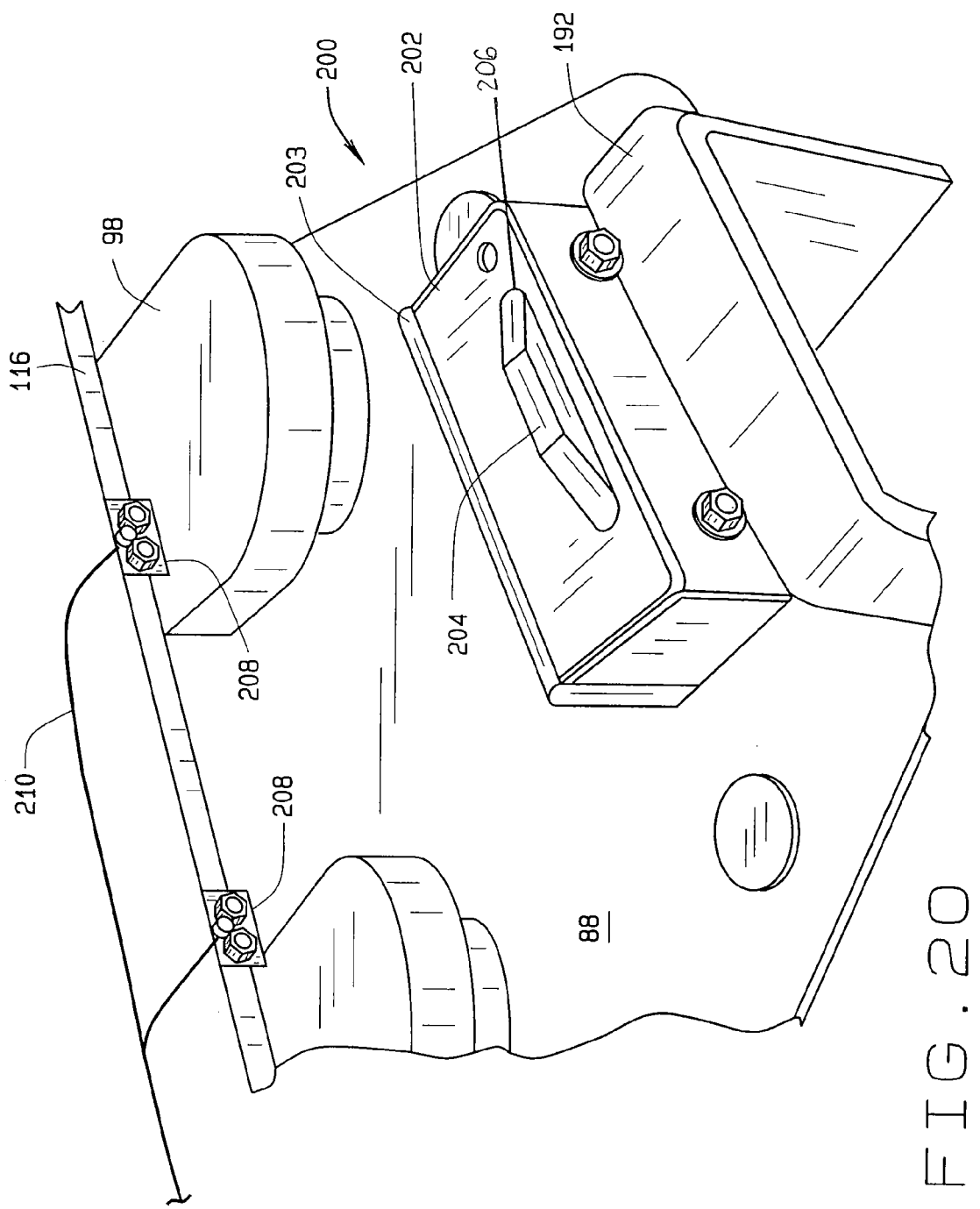
FIG. 20 is a perspective view of a turn warning system.
Figure 21:
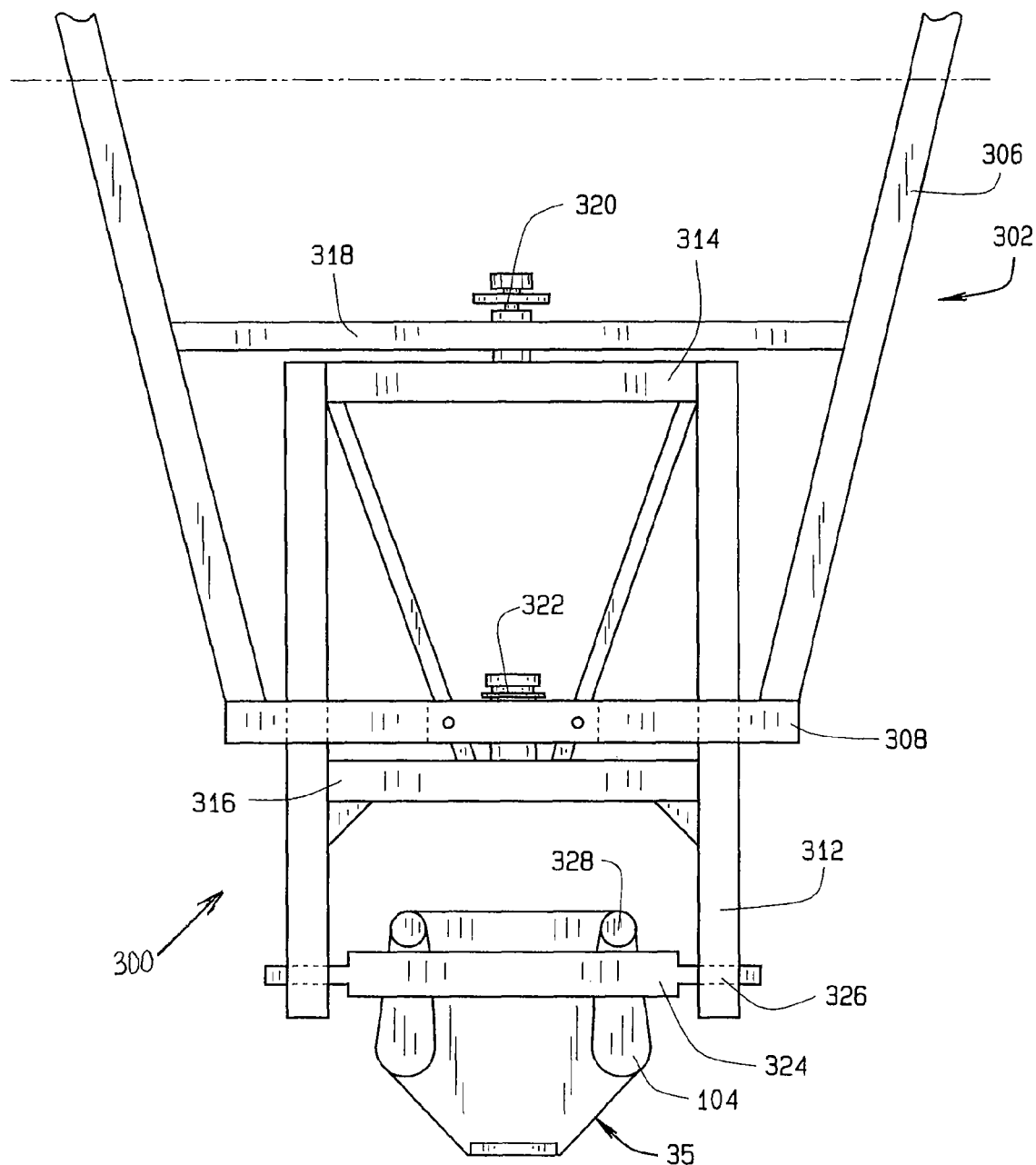
FIG. 21 is an overhead view of an alternate embodiment of a frame with integrated yoke assembly.

FIG. 20 depicts a turn warning assembly 200 that alerts the operator if the tow vehicle V is turning too sharply relative to the trailer T. A warning box 202 mounts to a stop 203, which is welded to the upper plate 88 of the front member 35 to the rear of the reinforcement band 192. A contact bar 204, preferably made of brass or other electrically conductive material, protrudes from a slot 206 in the warning box 202. A pair of contact plates 208, preferably made from brass or other electrically conductive material, are mounted to the front edge of the lower plate 116 of the rear member 42 with appropriate fasteners and are electrically insulated from the lower plate 116. An electrical wiring system 210 operatively connects the contact bar 204 and contact plates 208 to a power source. When the hitch assembly 10 pivots far enough in one direction, one of the contact plates 208 will make contact with the contact bar 204, thus, completing the circuit of the wiring system 210. When the circuit is completed, a signal is sent to a warning device, such as a horn or other audio or visual device.

Figure 18:
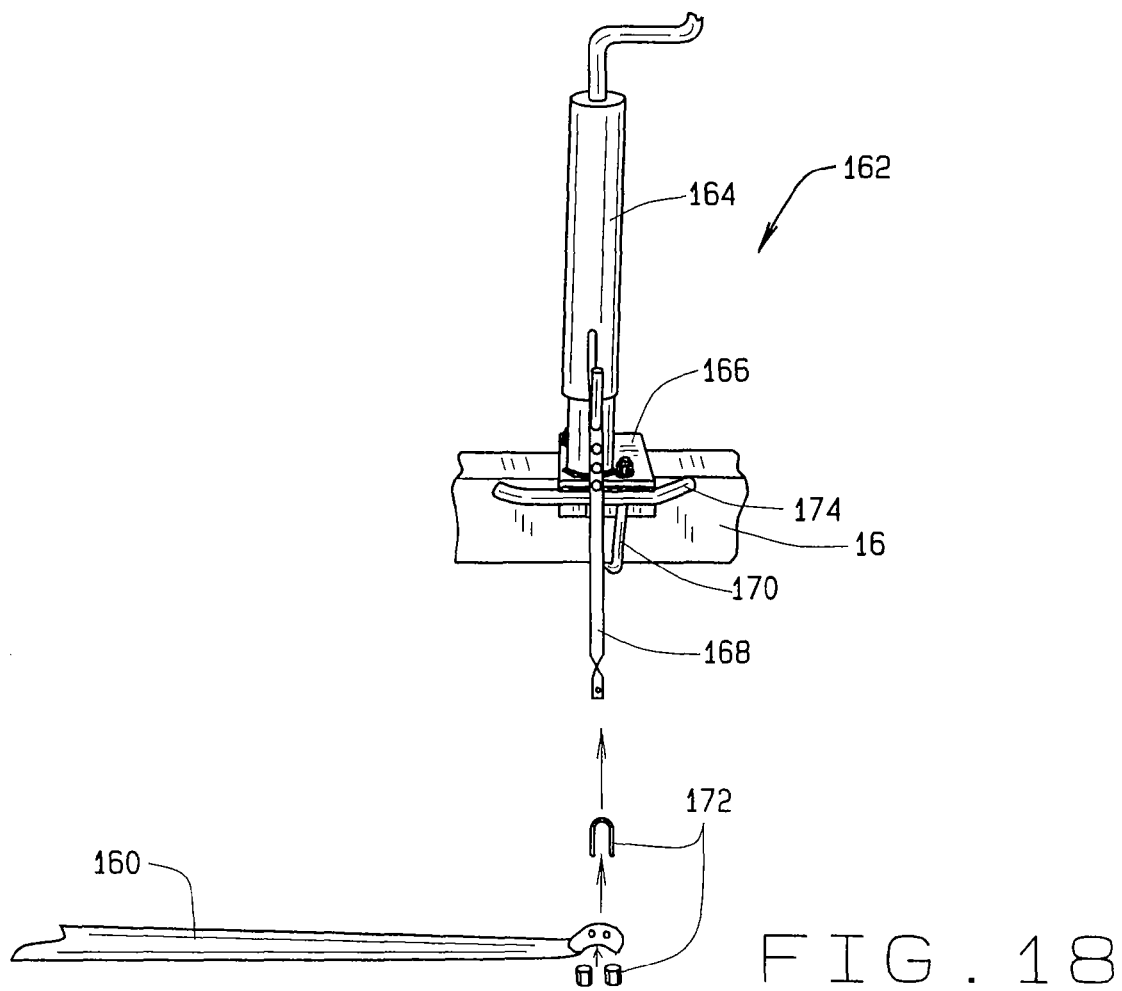
FIG. 18 is a partial side perspective view of the jack assembly.

As shown in FIGS. 21-24, an alternate embodiment of the hitch assembly 300 includes a modified frame 302 with an integrated yoke assembly 304 that directly connects to the rear member 42. As will be seen in the following description, this combination eliminates the need for some elements and facilitates the manufacture and assembly of other elements. For example, a hitch ball 26 and coupler 24 are no longer required because of the direct connection between the yoke assembly 304 and the rear member 42. The jack assembly 162 can be fixed to the frame 302, such as by welding, rather than removeably attached with jack brackets 166 and fasteners 170 (FIGS. 17-18). No provisions are necessary to accommodate different sizes and types of frames, couplers, and balls.

Figure 22:
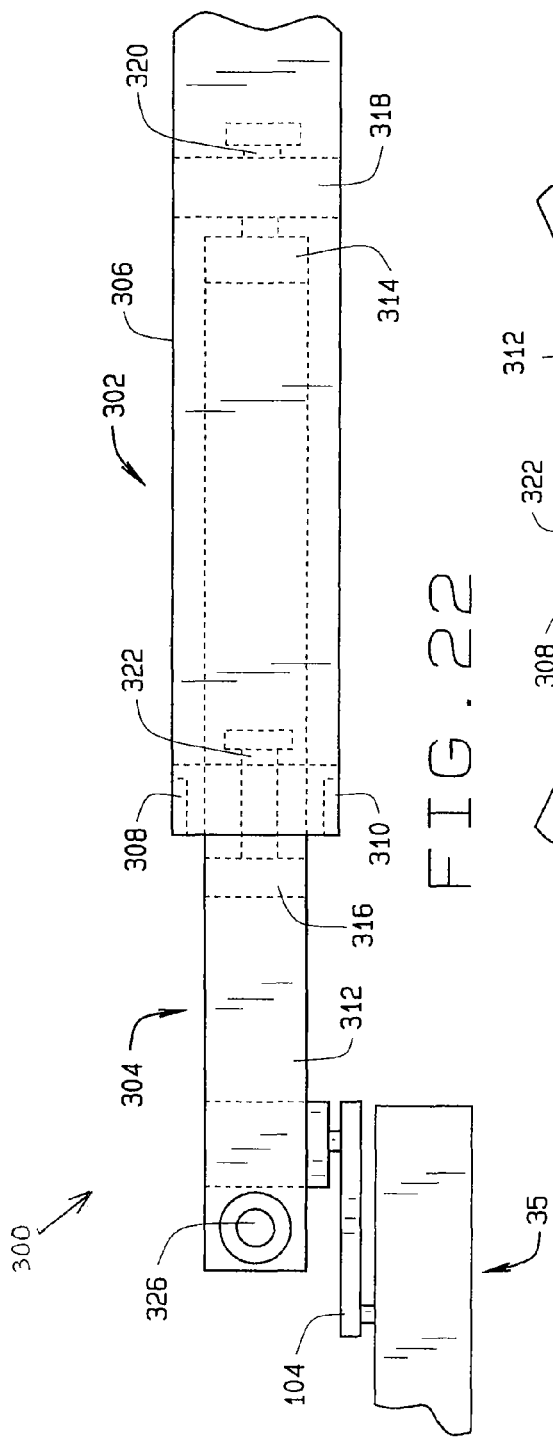
FIG. 22 is a side view of the alternate embodiment of the frame with integrated yoke assembly.

The frame 302 is a truncated A-frame, in that it has side members 306 which converge forwardly and are connected at their forward ends by an upper cross member 308 and a lower cross member 310, which defines an generally rectangular opening for receiving the yoke assembly 304 (FIG. 22). The cross members 308 and 310 should be able to support the trailer load and also withstand the pulling and stopping forces that occur during operation.

Figure 23:
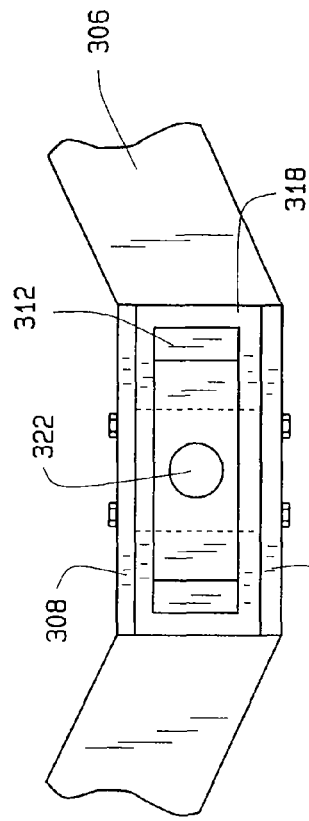
FIG. 23 is a front view of the alternate embodiment of the frame with integrated yoke assembly

The yoke assembly 304 includes two side arms 312 connected at their rear ends and middle portion by respective cross members 314 and 316. The rear cross member 314 pivotally connects to a cross member 318 of the frame 302 using a bearing 320. The middle cross member 316 attaches to the upper and lower cross member 308 and 310 of the frame 302 using a bearing 322 (FIGS. 22-23). The bearing connections allow the trailer to tilt from side-to-side in relation to the tow vehicle V for travel on uneven road surfaces. The two side arms 312 are pivotally connected at their front ends with bearings 326 to a support bar 324 (FIG. 22), which allows for uneven road surfaces such as humps. The support bar 324 is attached and supported through bearings 328 to the converging links 104 of the front member 35. The front member 35 connects to the adjustable hitch bar assembly 34 as described above.

Figure 24:
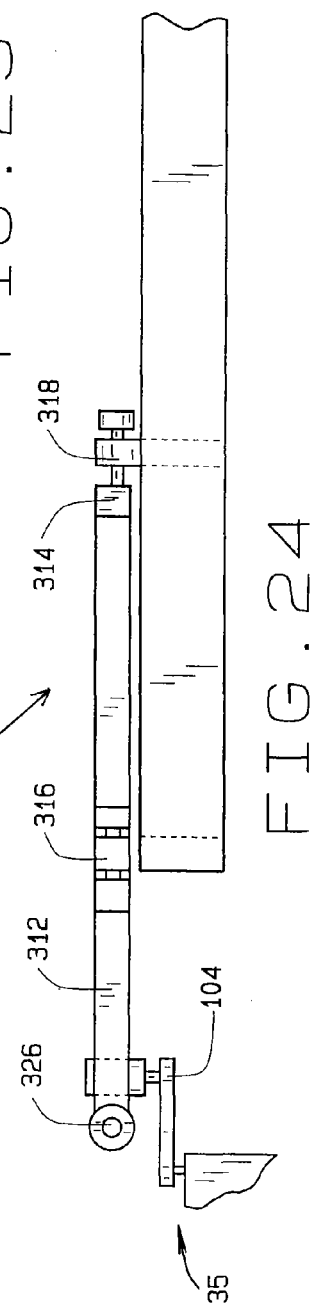
FIG. 24 is a side view of the alternate embodiment of the frame with an integrated and elevated yoke assembly.

In another alternate embodiment, the bearings are placed above or below the respective cross members to accommodate trailers having higher or lower elevation (FIG. 24). In addition, the hitch assembly 300 can be modified to accommodate straight tongue trailers.

Figure 25:
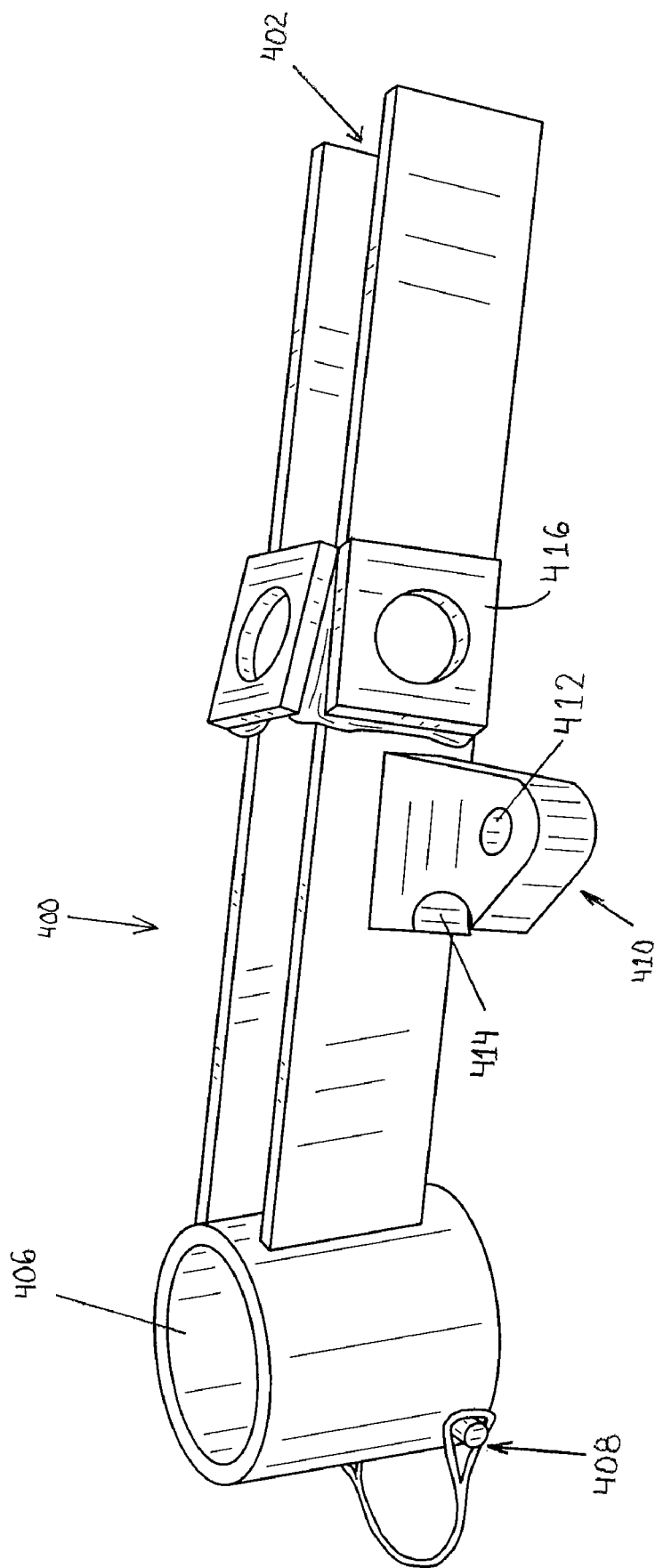
FIG. 25 is a perspective view of an alternate embodiment of a lot bar.

FIG. 25 shows an alternate embodiment of the lot-bar 400, which includes a bar 402, such as an I-beam, inserts into the hitch box 36 and projects forwardly in a generally horizontal orientation with its longitudinal axis along the centerline of the tow vehicle V (FIG. 19). At the opposite end of the bar 402 is a coupler 406 for engaging a hitch ball of a tow vehicle. The coupler 406 is a generally cylindrical socket that opens downwardly and is sized to receive a conventional trailer hitch ball. A bail 408 attaches to the front of the coupler 406 with appropriate fasteners, such as a pin, that is used to secure the coupler 406 to the hitch ball. An over-center latch tab 410 is welded to one side of the bar 402 at about the mid-section. The tab 410 projects laterally from the bar 402 and defines a through hole 412 and a concave recess 414 for coupling with the over-center latch assembly 38 as described above. The bar 402 also includes stops 416 welded to the rear of the tab 410 on all four sides of the bar 402 for mating with the hitch box 35. Although, the embodiment of FIG. 25 shows only a single over-center latch tab 410, those skilled in the art will recognize that a second over-center latch tab can be used on the opposite side of the bar 402. In addition, other couplers can be substituted with coupler 406 to engage various types of trailer hitch designs.

Changes can be made in the above constructions without departing from the scope of the invention, it is intended that all matter contained in the above description or shown in the accompanying drawings shall be interpreted as illustrative and not in a limiting sense.

What is claimed is:

1. A hitch assembly, comprising:
   a hitch bar for coupling with a tow vehicle;
   a front member coupled with the hitch bar;
   a rear member coupled with a trailer frame;
   a yoke adjustably coupled between the rear member and the trailer frame to preclude pivotal movement of the trailer frame relative to the rear member along a generally horizontal plane; and
   converging links pivotally connected between the front member and the rear member, whereby the angular position between the front member and the rear member can be varied, the converging links effectively moving the pivot point between the tow vehicle and trailer forward of the hitch assembly.

2. The hitch assembly of claim 1, wherein the front member comprises:
   an upper plate;
   a lower plate;
   a hitch box positioned between the upper plate and the lower plate, the hitch box defining an enclosure for receiving the hitch bar; and
   an over-center latch assembly pivotally attached between the upper plate and lower plate for securing to a latch tab of the hitch bar.

3. The hitch assembly of claim 1, wherein the rear member comprises:
   a lower member;
   a hitch ball attached to the lower member for coupling with the trailer frame;
   an end block attached to each end of the lower member;
   a front plate extending between the end blocks;
   a yoke extension pivotally attached to each end block at a front end, the yoke extension attached to the yoke at a rear end.

4. The hitch assembly of claim 1, wherein the yoke comprises:
   a tail section moveably coupled with the trailer frame;
   side members having generally parallel forward sections and inwardly angled rear sections connected to the tail section; and
   attachment plates extending generally upwardly from the forward sections of the side members for adjustable engagement with the rear member.

5. The hitch assembly of claim 1, wherein the hitch bar comprises:
   a vehicle portion having a first bar for engaging a hitch receiver of a vehicle and attachment plates defining a channel therebetween, wherein the plates define openings;
   a trailer portion adjustably and removeably coupled to the vehicle portion, the trailer portion having a second bar that couples with a trailer and an upright that inserts into the channel of the vehicle portion, the upright defining a plurality of holes that align with the openings of the vehicle portion to provide a plurality of predetermined elevations;

wherein the openings of the vehicle portion are positioned to allow angular adjustment of the trailer portion relative to the vehicle portion;

wherein the vehicle portion can be inverted to couple with the trailer portion; and wherein the trailer portion can be inverted to couple with the vehicle portion.

6. The hitch assembly of claim 1, further comprising:

a power source attached to a front member of the trailer hitch;

a contact bar operatively connected to the power source and attached to the front member;

a contact plate operatively connected to the power source and attached to the rear member, the contact plates being positioned to contact the contact bar when the tow vehicle pivots to a predetermined angular position relative to the trailer frame; an indicator operatively connected to the power source that indicates to an operator when the contact plate is in contact with the contact bar.

7. The hitch assembly of claim 1, further comprising:

a spring bar having a first slot at a front end and a rear end engaged with the trailer frame;

inner bearing pivotally coupled to the front end of the spring bar, the inner bearing having a second slot aligned with the first slot;

a disc inserted into the aligned first slot and second slot; and an outer bushing attached to the trailer hitch, the outer bushing having a bore that receives the inner bearing, spring bar, and disc.

8. The hitch assembly of claim 7, further comprising, a jack assembly connected between the trailer frame and the spring bar.

9. The hitch assembly of claim 1, wherein the connecting links are pivotally connected between the front member and the rear member using tapered roller bearings.

10. A hitch assembly for detachable engagement between a tow vehicle having a hitch receiver and a trailer frame, comprising:

a hitch bar having a vehicle portion shaped and sized for detachable engagement with the hitch receiver, and a trailer portion shaped and sized for adjustable and detachable engagement with the vehicle portion for accommodation of elevation and angular differences between the hitch receiver and the hitch assembly;

a front member having an over-center latch assembly configured for detachable engagement with the hitch bar;

a rear member having a hitch ball configured for detachable engagement with the trailer frame;

a yoke configured for adjustable engagement between the rear member and the trailer frame for preclusion of pivotal movement of the trailer frame relative to the rear member along a generally horizontal plane; and converging links pivotally connected between the front member and the rear member for variance of the angular position between the front member and the rear member, the converging links effectively moving the pivot point between the tow vehicle and trailer forward of the hitch assembly.

11. The hitch assembly of claim 10, wherein the hitch bar further comprises:

a first bar configured for detachable engagement with the hitch receiver;

attachment plates attached to the first bar defining a channel therebetween, wherein the plates define openings;

a second bar configured for detachable engagement with the trailer an upright sized and shaped for insertion into the channel, the upright defining a plurality of holes that align with the openings of the attachment plates to provide a plurality of predetermined elevations;

wherein the openings of the attachment plates are positioned to allow angular adjustment of the trailer portion relative to the vehicle portion.

12. The hitch assembly of claim 10, wherein the vehicle portion can be inverted for detachable engagement with the trailer portion; and wherein the trailer portion can be inverted for detachable engagement with the vehicle portion.

13. The hitch assembly of claim 10, wherein the front member comprises:

an upper plate;

a lower plate;

a hitch box positioned between the upper plate and the lower plate, the hitch box defining an enclosure for receiving the hitch bar; and an over-center latch assembly pivotally attached between the upper plate and lower plate for securement of a latch tab of the hitch bar.

14. The hitch assembly of claim 10, wherein the rear member comprises:

a lower member;

a hitch ball attached to the lower member for detachable engagement with the trailer frame;

an end block attached to each end of the lower member;

a front member plate extending between the end blocks; and a yoke extension pivotally attached to each end block at a front end, the yoke extension attached to the yoke at a rear end.

15. The hitch assembly of claim 10, wherein the yoke comprises:

a tail section moveably coupled with the trailer frame;

side members having generally parallel forward sections and inwardly angled rear sections connected to the tail section; and attachment plates extending generally upwardly from the forward sections of the side members for adjustable engagement with the rear member.

16. The hitch assembly of claim 10, further comprising:

a power source attached to a front member of the trailer hitch;

a contact bar operatively connected to the power source and attached to the front member;

a contact plate operatively connected to the power source and attached to the rear member, the contact plates being positioned to contact the contact bar when the tow vehicle pivots to a predetermined angular position relative to the trailer frame; and an indicator operatively connected to the power source that indicates to an operator when the contact plate is in contact with the contact bar.

17. The hitch assembly of claim 10, further comprising:

a spring bar having a first slot at a front end and a rear end engaged with the trailer frame;

inner bearing pivotally coupled to the front end of the spring bar, the inner bearing having a second slot aligned with the first slot;

a disc inserted into the aligned first slot and second slot; and an outer bushing attached to the trailer hitch, the outer bushing having a bore that receives the inner bearing, spring bar, and disc.

18. The hitch assembly of claim 17, further comprising, a jack assembly connected between the trailer frame and the spring bar.

19. The hitch assembly of claim 10, wherein the connecting links are pivotally connected between the front member and the rear member using tapered roller bearings.

20. A hitch assembly for detachable engagement between a tow vehicle having a hitch receiver and a trailer frame, comprising:

- a hitch bar having a vehicle portion having a first bar shaped and sized for detachable engagement with the hitch receiver and attachment plates defining a channel therebetween, wherein the plates define openings; the hitch bar having a trailer portion shaped and sized for adjustable and detachable engagement with the vehicle portion, the trailer portion having a second bar that couples with the trailer frame and an upright that inserts into the channel of the vehicle portion, the upright defining a plurality of holes that align with the openings of the vehicle portion to provide a plurality of predetermined elevations; wherein the openings of the vehicle portion are positioned to allow angular adjustment of the trailer portion relative to the vehicle portion; wherein the vehicle portion can be inverted to couple with the trailer portion; wherein the trailer portion can be inverted to couple with the vehicle portion;
- a front member having an over-center latch assembly configured for detachable engagement with the hitch bar;
- a rear member having a hitch ball configured for detachable engagement with the trailer frame;
- a yoke configured for adjustable engagement between the rear member and the trailer frame for preclusion of pivotal movement of the trailer frame relative to the rear member along a generally horizontal plane; and
- converging links pivotally connected between the front member and the rear member for variance of the angular position between the front member and the rear member, the converging links effectively moving the pivot point between the tow vehicle and trailer forward of the hitch assembly.

* * * * *

UNITED STATES PATENT AND TRADEMARK OFFICE
CERTIFICATE OF CORRECTION

Page 1 of 1

PATENT NO.       : 7,857,344 B2
APPLICATION NO.  : 12/183265
DATED            : December 28, 2010
INVENTOR(S)      : James C. Hensley It is certified that error appears in the above-identified patent and that said Letters Patent is hereby corrected as shown below:

Column 12, Claim 14, line 26; after the word "front", and before the word "plate", the word "member" should be deleted.

Signed and Sealed this
Twenty-fourth Day of May, 2011

David J. Kappos
*Director of the United States Patent and Trademark Office*